(12) United States Patent
Kim et al.

(10) Patent No.: US 7,860,943 B2
(45) Date of Patent: Dec. 28, 2010

(54) ENHANCED NETWORK DIRECT ATTACHED STORAGE CONTROLLER

(75) Inventors: Han-gyoo Kim, Irvine, CA (US); Shin Hwan Hwang, Irvine, CA (US); Han Kyu Lim, Seoul (KR)

(73) Assignee: Zhe Khi Pak, Moscow (RU)

( * ) Notice: Subject to any disclaimer, the term of this patent is extended or adjusted under 35 U.S.C. 154(b) by 1024 days.

(21) Appl. No.: 11/360,331

(22) Filed: Feb. 23, 2006

(65) Prior Publication Data

US 2007/0008988 A1    Jan. 11, 2007

Related U.S. Application Data

(63) Continuation-in-part of application No. 11/210,521, filed on Aug. 23, 2005.

(60) Provisional application No. 60/603,917, filed on Aug. 23, 2005.

(51) Int. Cl.
G06F 15/16 (2006.01)
(52) U.S. Cl. .................................................. 709/217
(58) Field of Classification Search ................. 370/462, 370/431; 709/238
See application file for complete search history.

(56) References Cited

U.S. PATENT DOCUMENTS

| | | |
|---|---|---|
| 5,329,619 A | 7/1994 | Page et al. |
| 5,426,427 A | 6/1995 | Chinnock et al. |
| 5,463,772 A | 10/1995 | Thompson et al. |
| 5,513,314 A | 4/1996 | Kandasamy et al. |
| 5,524,247 A | 6/1996 | Mizuno |
| 5,566,331 A | 10/1996 | Irwin et al. |
| 5,721,818 A | 2/1998 | Hanif et al. |
| 5,774,660 A | 6/1998 | Brendel et al. |
| 5,781,550 A | 7/1998 | Templin et al. |
| 5,812,930 A | 9/1998 | Zavrel |
| 5,838,916 A | 11/1998 | Domenikos et al. |

(Continued)

FOREIGN PATENT DOCUMENTS

DE    19610840    9/1997

(Continued)

OTHER PUBLICATIONS

Blunden et al., "Storage Network Virtualization: What's it all about?", ibm.com/redbooks, XP-002286341, pp. 1-110, Dec. 2000.

(Continued)

*Primary Examiner*—Anh-Vu Ly
(74) *Attorney, Agent, or Firm*—Rothwell, Figg, Ernst & Manbeck, P.C.

(57) ABSTRACT

An apparatus and method for providing a storage medium accessible across a network to a host. The storage medium's operation is generally controlled by a network disk controller. The network disk controller may receive a packet from a remote host, decapsulate the packet, and act on the packet to either transmit data from a storage medium or write data to a storage medium. Generally, the network disk controller does not execute any file system. Rather, the file system for communication between the host and controller is executed by the host. The performance of the network disk controller generally matches that of a local (i.e., non-network) disk controller in terms of data access and writing.

7 Claims, 20 Drawing Sheets

U.S. PATENT DOCUMENTS

| | | | |
|---|---|---|---|
| 5,889,942 | A | 3/1999 | Orenshteyn |
| 5,987,523 | A | 11/1999 | Hind et al. |
| 5,987,627 | A | 11/1999 | Rawlings, III |
| 5,999,808 | A | 12/1999 | LaDue |
| 6,047,307 | A | 4/2000 | Radko |
| 6,085,234 | A | 7/2000 | Pitts et al. |
| 6,128,644 | A | 10/2000 | Nozaki |
| 6,128,690 | A | 10/2000 | Purcell et al. |
| 6,167,490 | A | 12/2000 | Levy et al. |
| 6,175,869 | B1 | 1/2001 | Ahuja et al. |
| 6,216,202 | B1 | 4/2001 | D'Errico |
| 6,226,518 | B1* | 5/2001 | An .................. 455/449 |
| 6,314,465 | B1 | 11/2001 | Paul et al. |
| 6,317,775 | B1 | 11/2001 | Coile et al. |
| 6,327,594 | B1 | 12/2001 | Van Huben et al. |
| 6,345,300 | B1 | 2/2002 | Bakshi et al. |
| 6,347,095 | B1 | 2/2002 | Tang et al. |
| 6,356,915 | B1 | 3/2002 | Chtchetkine et al. |
| 6,360,265 | B1 | 3/2002 | Falck et al. |
| 6,366,988 | B1 | 4/2002 | Skiba et al. |
| 6,389,432 | B1 | 5/2002 | Pothapragada et al. |
| 6,393,569 | B1 | 5/2002 | Orenshteyn |
| 6,404,766 | B1 | 6/2002 | Kitai et al. |
| 6,449,647 | B1 | 9/2002 | Colby et al. |
| 6,470,389 | B1 | 10/2002 | Chung et al. |
| 6,510,164 | B1 | 1/2003 | Ramaswamy et al. |
| 6,518,965 | B2 | 2/2003 | Dye et al. |
| 6,523,066 | B1 | 2/2003 | Montroy et al. |
| 6,529,996 | B1 | 3/2003 | Nguyen et al. |
| 6,539,446 | B1 | 3/2003 | Chan |
| 6,578,111 | B1 | 6/2003 | Damron et al. |
| 6,594,677 | B2 | 7/2003 | Davis et al. |
| 6,598,068 | B1 | 7/2003 | Clark |
| 6,609,167 | B1 | 8/2003 | Bastiani et al. |
| 6,647,016 | B1 | 11/2003 | Isoda et al. |
| 6,732,104 | B1 | 5/2004 | Weber |
| 6,760,783 | B1 | 7/2004 | Berry |
| 6,762,995 | B1* | 7/2004 | Drummond-Murray et al. .............. 370/229 |
| 6,807,581 | B1 | 10/2004 | Starr et al. |
| 6,823,458 | B1 | 11/2004 | Lee et al. |
| 6,834,326 | B1 | 12/2004 | Wang et al. |
| 6,894,981 | B1 | 5/2005 | Coile et al. |
| 6,941,576 | B2 | 9/2005 | Amit |
| 7,010,303 | B2 | 3/2006 | Lewis et al. |
| 7,069,312 | B2 | 6/2006 | Kostic et al. |
| 7,069,350 | B2 | 6/2006 | Fujita et al. |
| 7,076,690 | B1 | 7/2006 | Todd et al. |
| 7,124,128 | B2 | 10/2006 | Springer et al. |
| 7,251,704 | B2 | 7/2007 | Solomon et al. |
| 7,254,578 | B2 | 8/2007 | Devarakonda et al. |
| 7,277,955 | B2 | 10/2007 | Elliott |
| 7,376,133 | B2 | 5/2008 | Gettala et al. |
| 7,383,229 | B2 | 6/2008 | Jacoby |
| 2002/0069245 | A1 | 6/2002 | Kim |
| 2002/0078311 | A1* | 6/2002 | Matsuzaki et al. .......... 711/149 |
| 2002/0188754 | A1* | 12/2002 | Foster et al. ................ 709/238 |
| 2003/0014569 | A1 | 1/2003 | Kim |
| 2003/0018403 | A1 | 1/2003 | Braun et al. |
| 2003/0028614 | A1 | 2/2003 | Jeon |
| 2003/0172149 | A1 | 9/2003 | Edsall et al. |
| 2003/0225834 | A1 | 12/2003 | Lee et al. |
| 2004/0068563 | A1 | 4/2004 | Ahuja et al. |
| 2004/0117813 | A1 | 6/2004 | Karaoguz et al. |
| 2004/0148461 | A1* | 7/2004 | Steinmetz et al. ........... 711/114 |
| 2004/0220933 | A1 | 11/2004 | Walker |
| 2005/0042591 | A1 | 2/2005 | Bloom et al. |
| 2005/0110768 | A1 | 5/2005 | Marriott et al. |
| 2005/0125501 | A1* | 6/2005 | Inomoto et al. ............. 709/208 |
| 2005/0149682 | A1 | 7/2005 | Kim |
| 2005/0193017 | A1 | 9/2005 | Kim |
| 2005/0193189 | A1 | 9/2005 | Kim |
| 2006/0004935 | A1 | 1/2006 | Seto et al. |
| 2006/0010287 | A1 | 1/2006 | Kim |
| 2006/0045130 | A1 | 3/2006 | Kim |
| 2006/0067356 | A1 | 3/2006 | Kim |
| 2006/0069884 | A1 | 3/2006 | Kim |
| 2006/0155805 | A1 | 7/2006 | Kim |
| 2007/0008988 | A1 | 1/2007 | Kim |

FOREIGN PATENT DOCUMENTS

| | | |
|---|---|---|
| DE | 10038142 | 2/2001 |
| JP | 10113469 | 5/1998 |
| JP | 10271562 | 10/1998 |
| JP | 11007404 | 1/1999 |
| JP | 11114224 | 4/1999 |
| KR | 2000072493 | 12/2000 |
| KR | 2001088528 | 9/2001 |
| WO | WO99/03297 | 7/1999 |
| WO | WO 00/29529 | 5/2000 |

OTHER PUBLICATIONS

Klein, Yaron, "Storage Virtualization with iSCSI Protocol", Internet Draft, XP015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

Japanese Office Action, App. No. 555298/2002, Jan. 9, 2007.

Japanese Office Action, App. No. 513300/2003, Feb. 6, 2007.

* cited by examiner

ENHANCED NETWORK DIRECT ATTACHED STORAGE CONTROLLER

CROSS-REFERENCE TO RELATED APPLICATIONS

This application is a continuation-in-part of United States Nonprovisional application Ser. No. 11/210,521, entitled "Method and Apparatus for Network Direct Attached Storage" and filed on Aug. 23, 2005, which claims benefit under 35 U.S.C. §119(e) of U.S. Provisional Application Ser. No. 60/603,917, titled "A Network Direct Attached Storage Suitable for Home Network" and filed on Aug. 23, 2004, which is incorporated by reference herein as if set forth in its entirety.

BACKGROUND ART

1. Technical Field

The present invention relates generally to computer-accessible storage devices, and more particularly to a network controller for facilitating access to a storage medium accessible to a host across a network.

2. Background of the Invention

Today, digital multimedia devices, such as set-top boxes, digital versatile disc (DVD) players, and high-definition television (HD-TVs), are becoming increasingly popular. These devices typically require storage and manipulation of multimedia comprising large amounts of data. Further, such storage and manipulation often occurs in a home setting. Therefore, research to create a suitable, efficient architecture for high volume storage targeted for home applications is increasingly common. Although many high volume storage devices such as hard disk drives and DVDs are widely used in a personal computing environment, mere high storage volume is not enough in the home network environment.

To appreciate the true advantages of a home network, storage devices (or storage media) otherwise dedicated solely to one application may be shared among multiple systems, and many different applications, across a network. However, it often is difficult to share storage media efficiently and conveniently because many existing storage media are designed for use inside a computing system or host. For example, to play an HD-TV program at a computer lacking a HD-TV tuner card, the program typically must be demodulated in a set-top box and saved to the hard disk drive inside the set-top box. Next, it must be copied to the storage medium in the computer and played at the computer display. Copying of large files or programs may be inconvenient. Additionally, in a home network environment, copying necessarily duplicates content and thus wastes storage capacity. One approach to address these problems is to allow symmetric access to storage media's contents by participating application devices. For example, a set-top box may directly save a recorded program in a network storage medium, which may permit a computer to directly access the stored program for viewing. In such an approach, the network interface to the storage medium and/or application devices (such as a host) should be designed to efficiently utilize home multimedia devices.

Additionally, consumer electronics often are sold at a relatively low price. Furthermore, rapid technology advancements, combined with rapid growth of available contents, means consumer electronics are often supplemented with cheaper, faster, or more efficient devices. Many people, for example, supplement a compact disk player with a digital music player. Thus, low cost is one exemplary consideration for consumers purchasing home network devices. Another exemplary consideration for many consumers is whether a home network device offers sufficient performance to support multimedia applications requiring large amounts of bandwidth. Ideally, the performance of the network storage device should be limited only by the performance of the storage medium itself. That is, the network device controller should perform like a local input/output (I/O) device controller, and the storage medium should be able to yield performance comparable to that of a locally connected storage.

Although there have been many network storage devices, most (if not all) are not well suited for application in home networks. A network file server, the most widely used network storage, may be too expensive for home use. Although in some cases a network file server has been designed using an embedded processor for the purpose of reducing an implementation cost, such servers typically do not offer sufficient performance to support multimedia applications. Rather, a bottleneck is imposed by software processing of the critical network protocol. Such servers are mainly focused on maximizing the performance of a bank of storage media. By contrast, Universal Serial Bus (USB) mass storage media may be offered at a low cost for end users and thus is a candidate for home network storage. However, it is often difficult for a USB mass storage medium to be shared among multiple devices because a USB network is inherently limited to a single host.

Accordingly, there is a need in the art for an improved storage medium directly accessible to a host connected to the storage medium across a network.

SUMMARY

Generally, one embodiment of the present invention takes the form of a storage system for storing computer-readable data on a storage medium connected to a host by a network. The exemplary embodiment may manage communications between the storage medium and the host, and may further coordinate commands (such as read and/or write commands) issued by the host to the storage medium. The exemplary embodiment may employ an improved or exemplary network disk controller to perform such operations. Typically, the network disk controller does not include or execute a device driver associated with the storage medium, nor does it include or execute a file system responsible for (for example) managing files on the storage medium. Rather, in the exemplary embodiment, the device driver and/or file system is typically executed by each host.

Another embodiment of the present invention takes the form of a network-accessible storage medium system having a network storage medium controller, and a storage medium operatively connected to the network storage medium controller, wherein neither the network storage medium controller nor the storage medium executes a network file system. The network storage medium controller may include a protocol engine, and a command processing engine operatively connected to the protocol engine. The protocol engine may generally facilitate operations related to the protocol of a packet received across a network, while the command processing engine may generally facilitate commands for accessing the storage medium. The network-accessible storage medium system may also include a disk controller operative to control the operations of the storage medium, the disk controller operatively connected to the command processing engine, and a network controller operative to receive a packet from a network, the network controller operatively connected to the protocol engine.

Another embodiment of the invention may be a method for accessing a storage medium across a network, including the operations of receiving a packet from a network, decapsulating the packet into a header and a payload, determining, from the header, a protocol associated with the payload, determining whether the payload is associated with a non-network storage medium access command, and, in the event the payload is associated with a local storage medium access command, executing the non-network storage medium access command. In some embodiments, the non-network storage medium access command is a local access command. In still other embodiments, the local access command may be an ATAPI command.

Another embodiment of the present invention may take the form of a method for retransmitting a packet, including the operations of saving a last-executed command in a memory, determining a packet is lost during a transmission, in response to determining the packet is lost, queuing the last-executed command, and re-executing the last-executed command. The operation of determining if a packet is lost during a transmission may include determining if a packet is lost during a transmission across a network to a remote host. Further, the operation of re-executing the last executed command may include: reading a datum from a storage medium; encapsulating a protocol header with the datum to form a retransmission packet; and transmitting the retransmission packet; wherein the retransmission packet and the packet are structurally identical.

It should be noted that multiple hosts may communicate with a single exemplary network disk controller. Similarly, a single host may communicate across a network with multiple exemplary network disk controllers. Accordingly, although an exemplary embodiment of the present invention (such as shown in FIG. 2) may depict a single host and a single exemplary network disk controller, alternative embodiments of the invention may include, or communicate with, multiple hosts and/or multiple exemplary network disk controllers. Similarly, multiple storage media may be connected to, and controlled by, a single exemplary network disk controller.

A further embodiment of the present invention may take the form of a network-accessible storage medium system, including a network storage medium controller, and a storage medium operatively connected to the network storage medium controller by a SATA connection, wherein neither the network storage medium controller nor the storage medium executes a network file system. In such an embodiment, the network storage medium controller may include a protocol engine, a command processing engine operatively connected to the protocol engine, and an arbitrator operatively connected to the command processing engine and controlling access to the storage medium.

Still a further embodiment of the present invention may be a method for accessing a storage medium across a network, including the operations of receiving a first packet from a network at a first controller module, decapsulating the first packet into a header and a payload, determining, from the header, a protocol associated with the payload, determining whether the payload is associated with a non-network storage medium access command, in the event the payload is associated with a local storage medium access command, executing the non-network storage medium access command, and assigning a communication link between an arbitrator and the storage medium to the first controller module. This embodiment may also receive a second packet from a second host, determine whether the communication link between the first controller module and the storage medium is assigned, and, in the event the communication link is assigned, prevent the second packet from reaching the storage medium.

Yet an additional embodiment of the present invention may take the form of an apparatus for controlling access to a storage medium, including a first control module operative to connect to a first host, a second control module operative to connect to a second host, a third control module operative to connect to the storage medium, an arbitrator module operative to receive data from the first and second control modules, and a signal line operative to indicate if a one of the first and second hosts is in communication with the storage medium, wherein, in the event the one of the first and second hosts is in communication with the storage medium, the arbitrator module is operative to assign the third control module's operation to the one of the first and second hosts in communication with the storage medium. This embodiment's arbitrator may also be operational to block all data from a second one of the first and second hosts not in communication with the storage medium. The embodiment's arbitrator may be still further operative to release the third control module's operation from the one of the first and second hosts when the communication terminates.

These and other advantages of the present invention will be apparent upon reading the appended description and claims.

BRIEF DESCRIPTION OF THE DRAWINGS

FIG. 29 depicts a second set of data paths corresponding to the enhanced network disk controller of FIG. 15 operating in the operating environment of FIG. 18.

DETAILED DESCRIPTION OF THE INVENTION

I. Overview

Generally, one embodiment of the present invention takes the form of a storage system for storing computer-readable data on a storage medium connected to a host by a network. The exemplary embodiment may manage communications between the storage medium and the host, and may further coordinate commands (such as read and/or write commands) issued by the host to the storage medium. The exemplary embodiment may employ an improved or exemplary network disk controller to perform such operations. Typically, the network disk controller does not include or execute a device driver associated with the storage medium, nor does it include or execute a file system responsible for (for example) managing files on the storage medium. Rather, in the exemplary embodiment, the device driver and/or file system is typically executed by each host.

Figure 2:
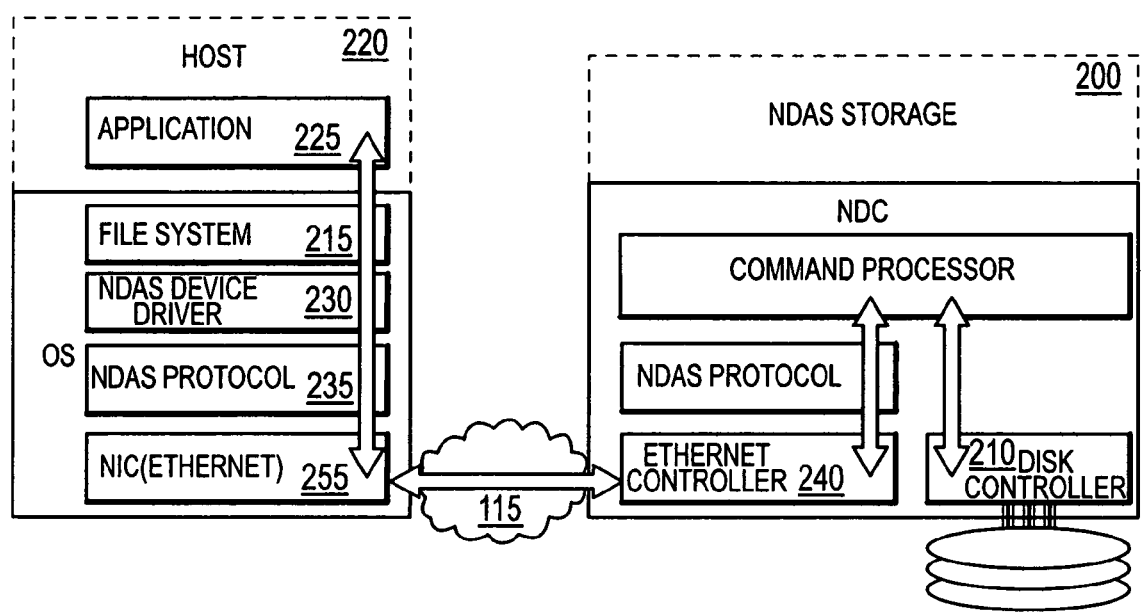
FIG. 2 depicts an exemplary embodiment of the present invention.

It should be noted that multiple hosts may communicate with a single exemplary network disk controller. Similarly, a single host may communicate across a network with multiple exemplary network disk controllers. Accordingly, although an exemplary embodiment of the present invention (such as shown in FIG. 2) may depict a single host and a single exemplary network disk controller, alternative embodiments of the invention may include, or communicate with, multiple hosts and/or multiple exemplary network disk controllers. Similarly, multiple storage media may be connected to, and controlled by, a single exemplary network disk controller.

As used herein, a "storage medium" may be any form of electronic or computer-readable media, including magnetic drives or media (such as a hard disk or tape drive), optical drives or media (such as a compact disk drive or digital versatile disk drive), magneto-optic drives or media, solid-state memory, random access memory, read-only memory, or any other form of storage known to those of ordinary skill in the art.

Similarly, although the term "exemplary network disk controller" is used throughout this specification to describe at least a portion of an exemplary embodiment of the present invention, it should be understood that the controller may operate on or with any form of storage medium.

Generally, the host described in this document may be any form of computing device sufficiently powerful to perform the functions described herein, such as a personal computer, mainframe, minicomputer, notebook computer, personal data assistant (PDA), other information appliance, and so forth. In like manner, the network may be any form of network known to those of ordinary skill in the art, including, but not limited to, a wired network, a wireless network, an Ethernet, a local area network, a wide area network, the Internet, and so on. In yet other embodiments, a television set-top box may act as a host, as may a receiver or other piece of stereo equipment. A multimedia computer is yet another exemplary host.

Figure 1:
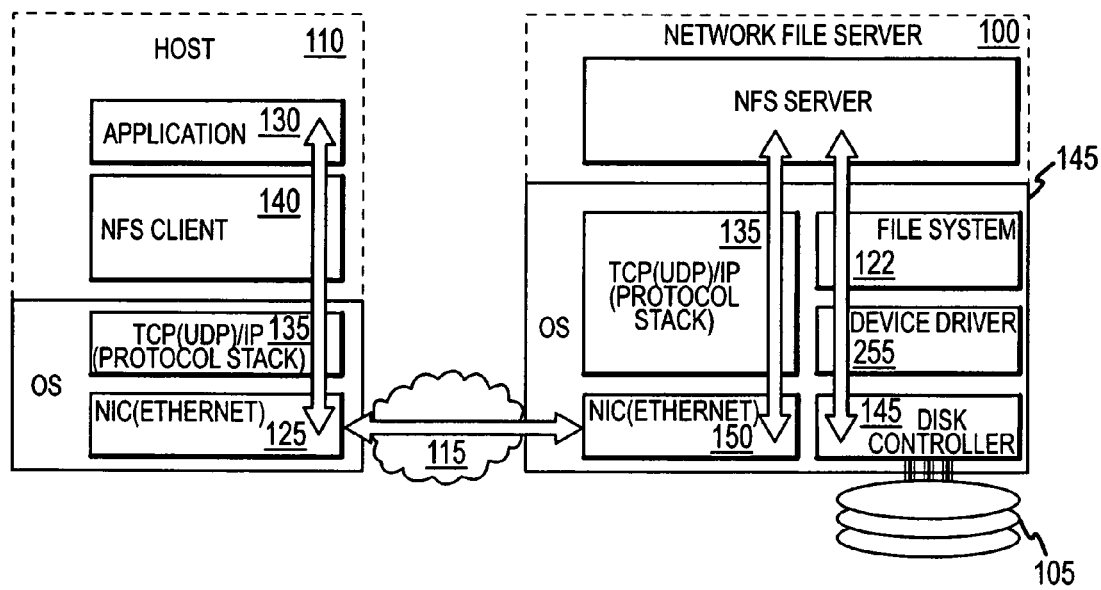
FIG. 1 depicts a prior art network storage medium and associated architecture.

FIG. 1 depicts a prior art storage system for storing computer-readable data on a storage medium 105 connected to a computer (host 110) by a network 115. A server 100 may include the storage medium 105, a disk controller 120, a processor (not shown), a server file system 122 and an external interface 125 for communicating across the network, and optionally other elements not shown in FIG. 1. A host 110, located remotely from the server, may execute an application 130 to access the storage medium across the network. Typically, the application includes or is compliant with a file system protocol stack 135 for remote media access, such as the Network File System and/or Common Internet File System protocols. A file system client 140 may facilitate interaction between the application 130 and the protocol stack 135.

Data may be transferred between the host 110 and server 100 in "packets." The protocol employed by a given packet may be specified in a protocol header attached to, or incorporated in, the packet. A "packet," as known to those skilled in the art, is a unit of data sent across a network. The packet may include a protocol header and a data frame or section. The data section typically stores the data sent in the packet, in accordance with the protocol chosen and specified in the protocol header. Packets may contain a variety of additional information, which may (or may not) be stored in different or separate frames. Command packets typically contain commands to be executed by either a host 110 or server 100 (or, as discussed below, an exemplary embodiment of the present invention), while data packets typically contain data requested by either a host or server (again, or an exemplary embodiment of the present invention).

Since the server 100 is accessible across the network 115 via a disk controller 145 and server network interface card 150, the storage medium may be shared by multiple hosts attached to the network. This architecture typically uses a file-oriented delivery method to transmit data from the storage medium 105 and/or server 100 to one or more hosts 110 (or vice versa). Therefore, the server must run a file system as part of the operating system in order to accommodate the processing of meta-data. Meta-data generally includes information about a file, such as a file's location on the storage medium, size, and so on. In such an architecture, all data requests require a file system operation. Thus, the processor's performance may limit that of the server 100.

II. Exemplary Embodiment

FIG. 2 shows an exemplary architecture of an exemplary embodiment 200 of the present invention. In this exemplary embodiment 200, a storage medium 205 may be operatively connected to a remote disk controller 210. The storage medium 205 and disk controller 210 together effectively perform the role of the server 100 discussed with respect to FIG. 1. However, neither the storage medium nor remote disk controller include, contain, or execute any file system 122, or if they should happen to include or contain a file system, for example because the have legacy device characteristics or are manufactured to perform in a number of operating environments, such file system is not used or executed.

More specifically, the exemplary embodiment 200 typically directly operates at a block level. A "block" is a minimum storage unit (or a raw storage material) from which files are formed. For example, the well-known Storage Area Network (SAN) protocol defines a block size for all storage media 105, 205 employing the protocol. Because the file system 215 is not present in either the storage medium 205 or remote disk controller 210 (but instead in the host 220), the exemplary embodiment 200 generally performs much simpler tasks than those performed by the server 100 of FIG. 1. Accordingly, the exemplary embodiment may be implemented in a simple hardwired control or in software on a low performance processor, typically without sacrificing performance when compared to the architecture of FIG. 1.

Additionally, the exemplary embodiment 200 has may be directly shared by multiple hosts 220, unlike certain prior art architectures. Applications 225 executed by one or more hosts may directly access the exemplary embodiment's storage medium without requiring any server file system intervention.

The operation of the exemplary embodiment 200 of FIG. 2 is described below, although a brief overview will now be provided. When an application 225 operating on the remote host 220 requests access to a file on the storage medium 205, the request is typically initiated as a system call by the host. The file request is effectively passed to the file system 215 running on the host. The file system may fragment the file request into multiple primitive disk input/output (I/O) requests, each of which are sent to the exemplary network disk controller 210 by a device driver 230 operating on the host. The device driver 230 may transmit, across the network and via a dedicated network protocol 235 discussed below, the various fragmented disk I/O requests to the remote disk controller 210. The remote disk controller 210 may then process the request or requests in much the same manner as a disk controller integral to the host 220 (i.e., by employing a command processor 207), except that the remote disk controller may optionally include a network interface 240. In some embodiments, the device driver 230 may employ a network protocol 235 known to those skilled in the art instead of a dedicated network protocol. For example, the device driver may employ TCP/IP as the network protocol in certain embodiments.

The exemplary network disk controller 210 and storage medium 205 may operate together as a network direct attached storage, or "NDAS." The NDAS generally provides remotely-accessible storage to a host 220, while permitting the host 220 to access the storage medium 205 by employing only standard local disk controller (or local protocol) access commands, such as those of the ATA/ATAPI protocol.

III. Performance Analysis

The exemplary embodiment 200 may provide performance roughly equal to that of a local disk controller (i.e., a disk controller affixed directly to a host 220). In other words, the delay seen by a host 220 in accessing data stored by the exemplary embodiment, including average network latency times, is approximately the same as the delay seen by the host when accessing data stored locally. Local data access is typically controlled by the aforementioned local disk controller.

The maximum time for the exemplary embodiment 220 to fetch and transmit data across a network 115, while maintaining access speed comparable to that of a local disk controller, should be approximately equivalent to the time required for a local disk controller to perform the same operation. The following analysis provides one (although not necessarily the sole) indication of an acceptable data access speed by the exemplary embodiment.

In the analysis, the following notations are used:
$T_{com}$: the time required to issue a command
$T_{se}$: the seek time of disk
$T_{tr}$: the turn around time of disk
$T_{dc}$: the disk controller latency
$T_{dma}$: the time required to complete a DMA operation
$T_{int}$: the interrupt latency $T_{nt}$: the network delay time
$T_{nic-com}$: the time required for a command packet to pass the network interface card
$T_{nic-data}$: the time required for all data packets to pass the network interface card
$T_{nic-rep}$: the time required for a reply packet to pass the network interface card
$T_{ndc-com}$: the time required for a command packet to pass the network disk controller
$T_{ndc-data}$: the time required for all data packets to pass the network disk controller
$T_{ndc-rep}$: the time required for a reply packet to pass the network disk controller
$T_{nic-data-p}$: the time required for a data packet to pass the network interface card ($T_{nic-data}=\Sigma T_{nic-data-p}$)
$T_{ndc-data-p}$: the time required for a data packet to pass the network disk controller ($T_{ndc-data}=\Sigma T_{ndc-data-p}$)
$T_{dma-p}$: time required for the DMA controller to transfer a data packet ($T_{dma}=\Sigma T_{dma-p}$)

Figure 3A:
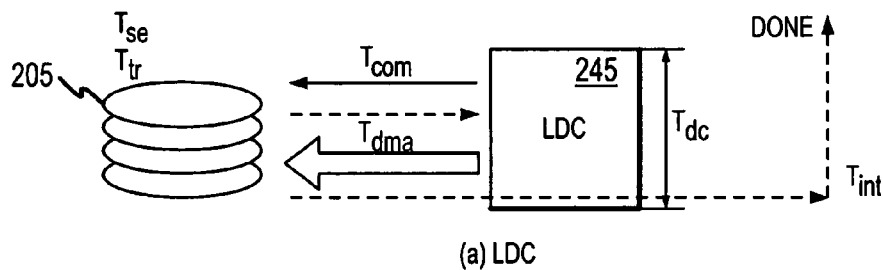
FIG. 3(a) is a diagram depicting the operation of the prior art network storage medium.

FIG. 3(a) illustrates the operations executed by a local disk controller 245. Generally, there are four operations. First, the local disk controller 245 issues a command (generally formatted as a Programmable Input/Output (PIO) command) and waits for a Direct Memory Access (DMA) request, which is issued by the storage medium 205. Upon receipt of the request, the local disk controller 245 performs the requested DMA operation. Finally, the storage medium 205 acknowledges the completion of the DMA operation to the controller through an interrupt. Accordingly, the total operation time, $T_{ldc}$, for the local disk controller to retrieve and transmit data is:

$$T_{ldc}=T_{com}+(T_{se}+T_{tr})+T_{dc}+T_{dma}+T_{int} \qquad (1)$$

Most prior network disk controllers 145, as known to those skilled in the art, effectively map signals and data packets generated or processed by a local disk controller 245 to a network equivalent. Thus, a one-to-one correspondence generally exists between data, commands, and other signals seen by a network disk controller and those seen by a local disk controller. The operation of a typical prior art network disk controller 145 is shown in FIG. 3(b).

Figure 3B:
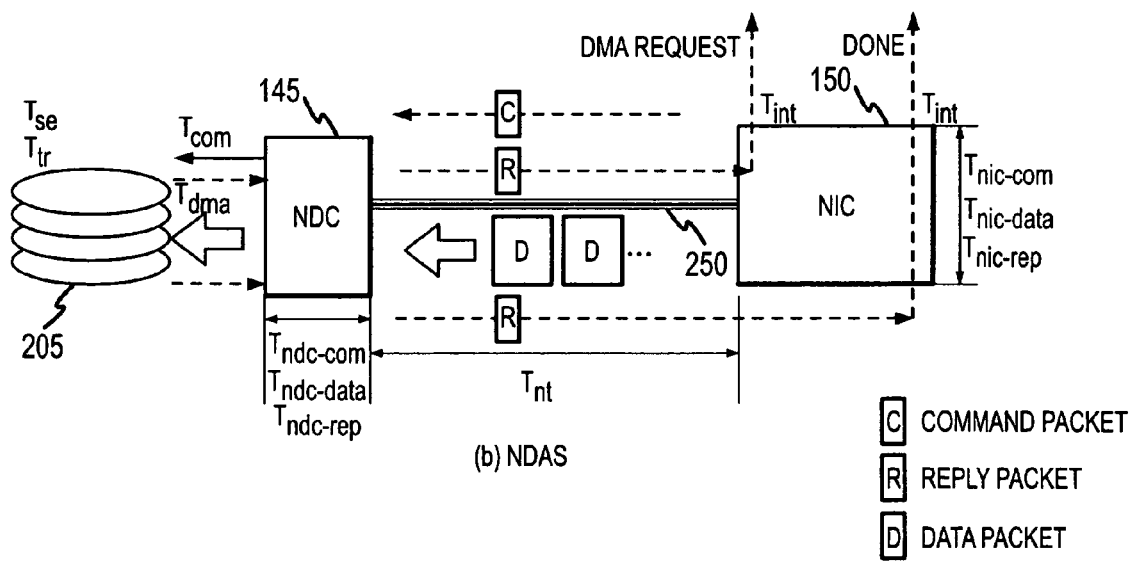
FIG. 3(b) is a diagram depicting the operation of the exemplary embodiment of FIG. 2.

In the prior art network disk controller 145 of FIG. 3(b), the following sequence generally occurs when data access is required. First, a command is issued via a command packet delivered to the network disk controller 145 through a network interface card 150 and a network cable 250. Next, a device driver 255 associated with the network disk controller waits for a DMA request. Upon receiving the reply packet containing the DMA request, the device driver 255 transfers the data packets from the storage medium 205 to the host 110. After the data transfer initiated by the DMA request is executed, the network disk controller sends a reply packet to acknowledge the completion. Thus, the total operation time for the prior art network disk controller to execute a data transfer, $T_{ndc}$, is:

$$T_{ndc} = (T_{nic-com} + T_{nt} + T_{ndc-com} + T_{com} + T_{ndc-rep} + T_{nic-rep} + T_{int}) + \qquad (2)$$
$$(T_{nic-data} + T_{nt} + T_{ndc-data}) + (T_{se} + T_{tr}) +$$
$$T_{dma} + (T_{ndc-rep} + T_{nt} + T_{nic-rep} + T_{int})$$

Because the prior art network disk controller 145 simply translates signals seen by the local disk controller 245 to network packets without considering any network 115 characteristics during translation or operation, inherent network delays are imposed at each transaction or data access. Such network delays therefore typically increase the time required for the network disk controller to execute its data access operation(s). To improve performance, an improved network disk controller 210 may minimize the effect of network delays or latencies.

Figure 4:
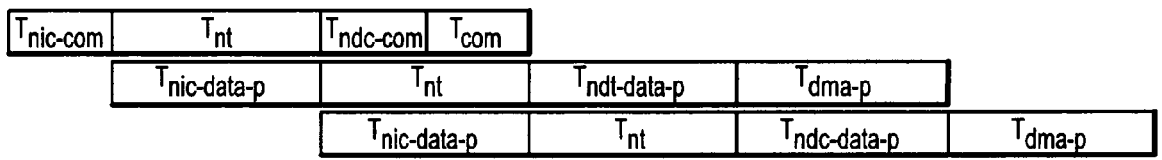
FIG. 4 depicts pipelined operations, as executed by the exemplary embodiment of FIG. 2.
Figure 4:
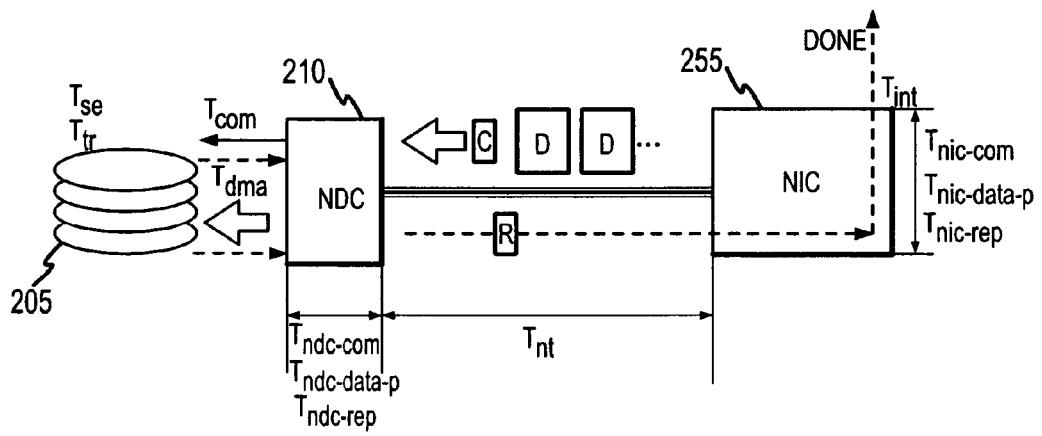

One improved network disk controller 210, as used in the exemplary embodiment 200, is shown in FIG. 4. In the exemplary embodiment's network disk controller 210, each of the multiple processes may be pipelined for parallel execution. Given such parallel execution, the first and second parenthetical terms of equation (2), representing the delays from waiting the DMA request and delivering all of the data, respectively, may be reduced as follows:

$$(T_{nic\text{-}com}+T_{nt}+T_{ndc\text{-}com}+T_{com}+T_{ndc\text{-}rep}+T_{nt}+T_{nic\text{-}rep}+T_{int})+(T_{nic\text{-}data}+T_{nt}+T_{ndc\text{-}data})\approx T_{nic\text{-}com}+T_{nic\text{-}data\text{-}p}+T_{nt}+T_{ndc\text{-}data\text{-}p} \quad (3)$$

That is, since the improved network disk controller's device driver 230 (located in the host 220) may transfer data packets without waiting for a DMA request packet and the improved network disk controller 210 may start a DMA operation before receiving data packets, imposed network delays may be hidden within overlapped processes.

From (1), (2), and (3), it can be seen that:

$$T_{ndc}=(T_{ldc}-T_{com}-T_{dc})+(T_{nic\text{-}com}+T_{nic\text{-}data\text{-}p}+T_{nt}+T_{ndc\text{-}data\text{-}p})+(T_{ndc\text{-}rep}+T_{nt}+T_{nic\text{-}rep}) \quad (4)$$

Generally speaking, $T_{com}$, $T_{nic\text{-}com}$, $T_{ndc\text{-}rep}$, and $T_{nic\text{-}rep}$ may be measured in hundreds of nanoseconds, while $T_{nic\text{-}data}$ and $T_{ndc\text{-}data}$ may be measured in tens of microseconds. The command and reply packets are typically tens of bytes, and the data packet is thousands of bytes. For purposes of performance optimization, $T_{nic\text{-}data\text{-}p}$ may be set to approximately equal $T_{dc}$ since, for both the local disk controller 245 and network interface card 255, data traverses similar paths in a host 220 and a DMA engine typically has a multiple-kilobyte internal buffer. Therefore, $$T_{ndc}\approx T_{ldc}-T_{dc}+T_{nic\text{-}data\text{-}p}+T_{ndc\text{-}data\text{-}p}+2T_{nt}\approx T_{ldc}+T_{ndc\text{-}data\text{-}p}+2T_{nt} \quad (5)$$

From equation (5), it can be determined that, for the improved network disk 210 controller to offer performance equal to the local disk controller 245, $T_{ndc\text{-}data\text{-}p}$ and $T_{nt}$ must be reduced. However, $T_{nt}$ is generally a network parameter. Thus, only $T_{ndc\text{-}data\text{-}p}$ may be minimized through equipment design. Therefore, possible key design parameters for an improved network disk controller 210 include pipelining each operation and minimization of $T_{ndc\text{-}data\text{-}p}$.

If the improved network disk controller 210 limits $T_{ndc\text{-}data\text{-}p}$ to less than approximately one hundred microseconds (i.e., such that $T_{ndc\text{-}data\text{-}p}$ may be measured in tens of microseconds), the expected performance would be:

$$T_{ndc}\approx T_{ldc}+2T_{nt}$$

$T_{nt}$ is a function of the network environment (such as a general home network 115), which typically includes at most one or two switches and a limited cable run 250 (on the order of ten to a hundred meters). Thus, $2T_{nt}$ is typically a small value when compared to $T_{ldc}$. That is, the average seek time and the average turnaround time of a commercial storage medium 205 and interrupt service routine overhead are typically several milliseconds taken together, while the network delay is generally several microseconds. Therefore, the expected operation time of the improved network disk controller 210 may be expressed as:

$$T_{ndc}\approx T_{ldc}$$

Accordingly, it may be seen that the improved network disk controller 210 may provide performance equal to a prior-art local disk controller 245.

As described previously, to achieve high performance, the improved network disk controller 210 may satisfy two kinds of features: pipelined operation and low latency. For the former, the improved network disk controller 210 may process data in units of packets instead of blocks. Such processing may be colloquially referred to as "per packet operation," or PPO. During PPO, the improved network disk controller begins a DMA operation whenever a command packet is received, even if a data packet has not yet been received. Typically, the improved network disk controller 210 has at least partially executed the DMA operation by the time the data packet arrives.

To support PPO, each data block must be capable of being operated on concurrently, since a subsequent data packet may arrive at the improved network disk controller 210 while the controller is processing a previously received data packet. A hardware-based design for the improved network disk controller may be preferred over a processor-based design because a processor based design typically requires a multi-processor architecture to implement parallel processing operations.

To provide acceptably low latency, the improved network disk controller 210 should be capable of handling the protocol header of any given packet within the time it takes the packet to be transmitted from the host 220, across the network 115, and be received at the controller (i.e., at "wire speed.") To reduce latency, the improved network disk controller may begin classification and verification of the header as soon as it receives the protocol header of a given packet. Accordingly, the improved network disk controller 210 generally processes the header while waiting for the rest of the corresponding packet to be received (such as the data of the packet).

If processing the header at wire speed is impractical or cannot be done by the improved network disk controller 210 due to physical or network limitations, another option is to at least partially buffer the corresponding packet. The payload of the packet may be buffered to save processing time, but at a cost of potentially increased latency.

IV. Architecture and Design

A. Block Diagram

Figure 5:
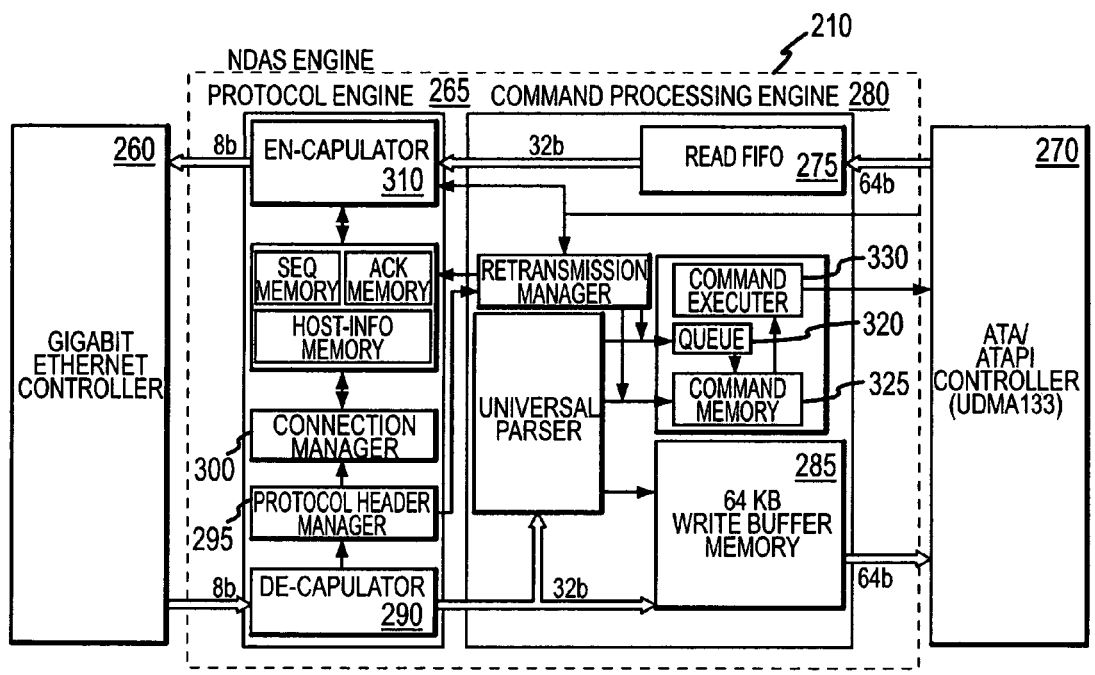
FIG. 5 depicts the architecture of an exemplary network disk controller, as employed in the exemplary embodiment.

The architecture of an exemplary network disk controller 210, as used in an exemplary embodiment of the present invention 200, is shown in FIG. 5. The exemplary network disk controller may include or be connected to, among other elements, an Ethernet controller 260 (for example, a Gigabit Ethernet controller), a protocol engine 265, a command processing engine 280, and an ATA/ATAPI controller 270 ("ATAPI controller"). The protocol and command processing engines may be implemented as two separate engines, or as a single engine responsible for the operations of both (as described later herein). A read buffer 275 may be included as part of the ATAPI controller 270, the command processing engine 280, or a unique element operationally connected to either. The read buffer 275 may have a two kilobyte storage capacity and handle data in a first in, first out (FIFO) manner in one embodiment; alternative embodiments may have different storage capacities or handle data in different manners. Similarly, a write buffer 285 may be included as part of the ATAPI controller 270, the command processing engine 280, or as a unique element operationally connected to either. In one exemplary embodiment, the write buffer may have 64 kilobytes of storage; alternative embodiments may vary this storage capacity.

Generally, the protocol engine 265 stores information regarding remote hosts (such as network addresses, packet sequences, information regarding the connection to remote hosts, and so forth), manages connections with remote hosts, and performs encapsulation and de-capsulation of a protocol header. The protocol engine 265 may obtain and/or maintain the information regarding a remote host 220, including the host's network address, port number, and/or a sequence number associated with one or more packets sent by the host. "Encapsulation" of a header refers to the process of adding a protocol header to data to form a packet. "Decapsulation" refers to the process of removing a protocol header from a received packet, effectively separating the packet into a data payload and a header. Accordingly, the protocol engine may include a number of sub-modules, such as an encapsulator module 310 (responsible for encapsulating a protocol header), a decapsulator module (responsible for decapsulating a protocol header), a host module (responsible for the storing the various host information, above), a connection manager (responsible for managing a connection to the host), and a protocol header manager. Generally, the protocol header manager 295 decodes a packet's protocol header, determining whether the packet (and protocol) is valid and recognized by the improved network disk controller 210, retrieves remote host and connection information from the header, and facilitates the operation of the connection manager 300 by providing the connection manager with some or all of this information. In short, the protocol engine 265 performs operations associated with, specified by, or required by the protocol of a given packet.

By contrast, the command processing engine 280 typically manages the read buffer 275 and write buffer 285, as well as parsing commands received across the network 115, managing retransmission of data and/or command packets, executing commands received across the network (typically from a host 220), and so on. The read buffer 275 generally stores data read from the storage device in response to a command packet issued by the host. Similarly, the write buffer 285 typically holds data to be written to the disk; such data may be transferred in a data packet across the network.

The ATA/ATAPI ("advanced technology attachment packet interface") controller 270 (or simply "ATAPI controller" herein) receives data from the write buffer 285, and transmits data to the read buffer 275. The ATAPI controller generally coordinates read and/or write operations involving the storage medium 205. The ATAPI controller 270 may support up to a 133 megabyte/second bandwidth connection to the storage medium 205 to cope with a 1 Gigabit/second network bandwidth. Alternative embodiments may employ a different controller, such as a SCSI ("small computer system interface") controller or others known to those skilled in the art.

The operations by which the exemplary network disk controller 210 may receive a packet and return another packet will now be discussed. First, the host 220 generally issues a command packet (or, in some cases, a data packet) across the network 115 to the exemplary network disk controller.

The operation of the network disk controller 210 starts with receipt of a connection establishment request packet from a host 220; the protocol engine 265 grants the request. After establishment of the connection, the host may transmit a command packet to the exemplary network disk controller. The command packet may, for example, instruct the network disk controller 210 to execute an input or output operation on the storage medium 205.

This packet is received by the Ethernet controller 260 (or other suitable network controller) and passed to the protocol engine 265. The packet header is decapsulated by the decapsulator module 290 of the protocol engine. That is, the header may be stripped from the packet and separately processed, as described herein. The header, which generally includes a packet's protocol, is passed from the decapsulator module 290 to the protocol header manager 295. The protocol header manager may determine what, if any, operations must be executed and/or what formalities observed during connection of the exemplary network disk controller 210 to the host 220 and/or during retransmission of packets. For example, the protocol header manager may determine what type of packet was received, the sequence of the packet, and the response to the packet. To that end, the protocol header manager 295 may instruct the connection manager 300 as to what operations are necessary to maintain or facilitate the host/controller connection, including the particular order and/or sequencing of packets and/or packet identifiers (such as, for example sequence packets and acknowledgement packets). For reference, sequence packets generally include sequential number indicating or establishing a sequence in which data is transmitted between the host 220 and exemplary network disk controller 210. By contrast, acknowledgement packets are transmitted between host and controller to acknowledge receipt of a particular sequence packet. Thus, the receipt of each sequence packet typically triggers transmission of an acknowledgement packet. The protocol header manager 295 may also communicate with the retransmission manager 305 (described below) of the command processing engine 280, in order to facilitate retransmission of a packet by the exemplary network disk manager 210 to the host 220, if necessary.

The connection manager 300, in turn, may access a memory to store or retrieve a sequence listing, acknowledgement listing, and/or host information to prepare a protocol header for an outgoing transmission. Typically, the sequence listing is accessed if the outgoing packet (i.e., the packet transmitted from the exemplary network disk controller to the host) is a sequence packet, and the acknowledgement listing is accessed if the outgoing packet is an acknowledgement packet.

The prepared, outgoing packet header may be received by the encapsulator module 310, which may encapsulate the header with the data portion of the packet. Once the packet includes the header, it may be transmitted across the network 115 and to the host 220 by the Ethernet controller 260.

After the decapsulator module 290 separates the packet header from the data portion of the packet, the data portion of the packet (or "payload") may be passed to the command processing engine 280. The data portion may be, for example, a command to be executed by the exemplary network disk controller 210. Alternately, the data portion at least partially may be data provided by the host 220 to be written or otherwise stored on the storage medium 205. Even where the data portion includes data to be written to the storage medium, the data portion also typically includes a write command.

Data may be passed to the write buffer 285, and from the write buffer to the ATAPI controller 270. The timing of passing the data from the write buffer to the ATAPI controller for writing to the storage medium 205 is typically controlled by the command processing engine 280.

The command included in the payload is processed by the command processing engine 280. Typically, the decapsulator module 290 of the protocol engine 265 passes the payload to the universal parser 315 of the command processing engine, which extracts the command. The universal parser may pass the command to a command queue 320 or directly into a command memory 325. If the command is passed into the command queue, it is sent to the command memory after the memory is cleared sufficiently to accept the command. The command executer 330 may retrieve (or otherwise accept) the command from the command memory, execute the command, and instruct the ATAPI controller as to the reading or writing of data initiated by the command, which may involve the write buffer 285 passing at least a portion of a payload to the ATAPI controller.

Occasionally, a packet must be retransmitted, either by the host 220 or by the exemplary network disk controller 210. The retransmission manager 305 accepts header protocol data from the protocol header manager 295 and may link it to a previously transmitted command. In such a case, the protocol header may specify the previously-transmitted packet and/or previously-transmitted command to be executed by the command processing engine 280. The retransmission manager 305 may pass the command to the command memory 325 and/or queue 320 for execution by the command executer 330, as described above.

Alternatively, the packet to be retransmitted may originate from the exemplary network disk controller 210. In such a case, the protocol header may specify the data that must be retransmitted. The retransmission manager 305 may then instruct the command executer 330 (through the command memory 325) to command the controller 270 to perform a read operation on the storage medium 205 in order to re-read the data being retransmitted. Effectively, the retransmission manager may instruct the exemplary network disk controller 210 to retransmit data in response to a request initiated by the host 220.

When the any of the operations above are completed, the command processing engine 280 sends a reply packet to the host 220. The reply packet is initiated in the command processing engine 280 by the command executer 330 and passed to the encapsulator 210. The encapsulator attaches the appropriate protocol header to the reply packet, which is in turn sent across the network 115 by the Ethernet controller 260.

B. Ethernet MAC Controller

The Ethernet controller 260 of the exemplary embodiment 200 may act as a media access control (MAC) controller, which are generally known to those skilled in the art. However, unlike many prior art MAC controllers, the exemplary embodiment generally employs a MAC controller that supports a 1 Gigabit per second (1 Gb/s) data transfer rate.

Figure 6A:
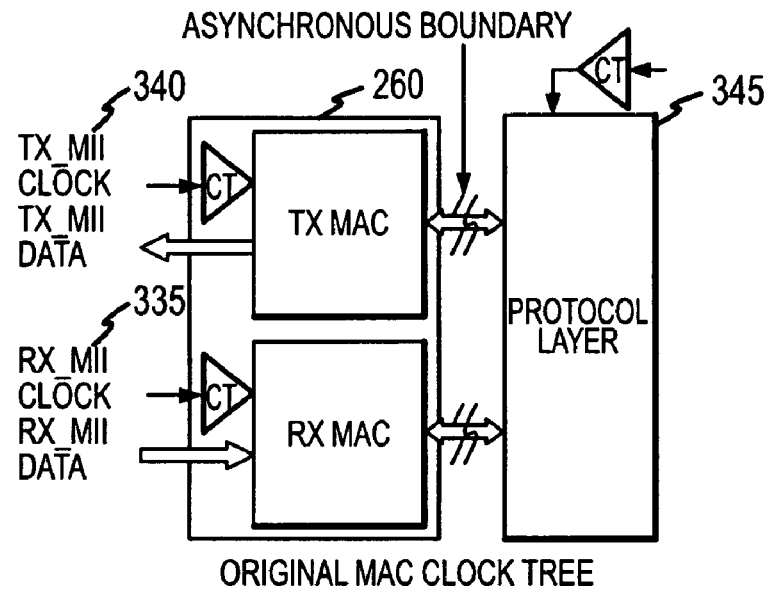
FIG. 6(a) depicts a MAC clock tree, as known in the prior art.
Figure 6B:
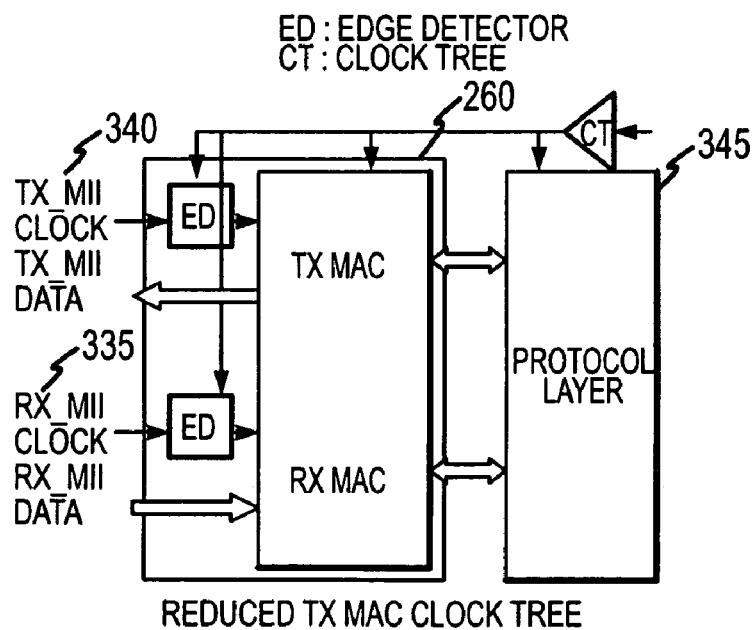
FIG. 6(b) depicts an exemplary, reduced MAC clock tree.

To ensure compatibility and/or operability with computing devices that may not support a data transfer rate of 1 Gb/s, the MAC controller 260 of the exemplary embodiment 200 typically supports both the Gigabit Media Independent Interface (GMII) and the Media Independent Interface (MII). These two interfaces generally have different clock interfaces. MII has two clock inputs, RX_CLK 335 and TX_CLK 340, fed by a physical-layer (PHY) chip with either a 25 megahertz (MHz) or 2.5 MHz clock. By contrast, GMII typically employs a first clock input having a 125 MHz cycle (RX_CLK) fed by a PHY chip, and a second clock input at 125 MHz (GTX_CLK), which is derived from the system clock in the MAC controller 260. As shown in FIG. 6(*a*), these clock interfaces 335, 340 may provide the MAC controller with multiple clock domains having separate clock trees. When designing an application-specific integrated circuit (ASIC) to implement all or part of the exemplary embodiments discussed herein, such as the improved network disk controller 210, the multiple clock domains may complicate the design process and impose asynchronous boundaries between the MAC layer and protocol layer of a network 115. Such an asynchronous boundary may increase communication latency between different clock domains, and thus delay communication across the network.

To prevent such latencies, exemplary embodiments of the present invention may employ a unified clock scheme (UCS). The UCS employs an over-sampling technique to merge multiple clock trees 335, 340 into a single clock tree, as shown in FIG. 6(*b*). By employing a single clock tree, the MAC 260 and protocol layers 345 may be synchronized.

Figure 7:
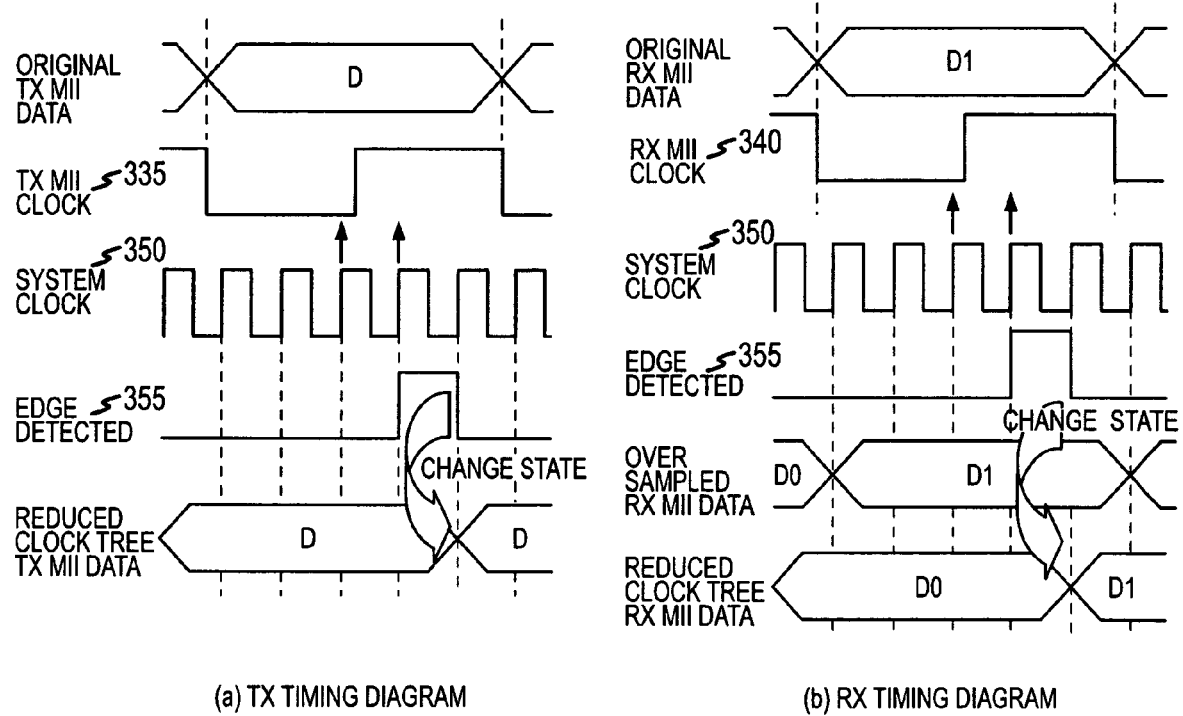
FIG. 7(a) depicts a first timing diagram for use with the MAC clock tree of FIG. 6(b).
FIG. 7(b) depicts a second timing diagram for use with the MAC clock tree of FIG. 6(b).

FIGS. 7(*a*) and 7(*b*) illustrate the operating timing diagram of the UCS in two different modes, as employed in certain embodiments of the present invention. In the UCS, all clocks 335, 340, 350 serving as inputs to MAC state machines are unified with the fastest system clock. In the example of FIGS. 7(*a*) and 7(*b*), the fastest system clock operates at 125 MHz. An edge detector 375 may generate a stream of edge-detection signals at the MII clock interval, that is, every 40 nanoseconds (ns) if data transfer occurs at a rate of 100 megabits per second (MB/s) across the network, or every 400 ns if data transfer occurs at a rate of 10 Mb/s. In either data transfer mode, the edge detector generates edge-detection signals 355 by sampling the appropriate MII clock 335, 340. The finite state machines in the MAC controller 260 change their states only when an edge-detection signal is asserted. All the registers in the finite state machines are activated only if the edge-detection signal is asserted. Thus, all output signals from the MAC 260 controller have the period and cycle of the MII clock 335, 340. It should be noted that the edge-detection signal 355 outputted by the edge detector 375 is sampled at the rising edge of the system clock 350. Further, the edge detector detects the rising edge of the MII clock. Accordingly, the edge detection signal 355 effectively represent the MII clock synchronized to the system clock. In the present embodiment, all registers and signals are synchronized to the system clock (which is typically the highest clock rate), but enabled or activated by the edge detection signal. Accordingly, the embodiment operates at the desired clock rate (i.e., the MII clock rate), while synchronized to the single fastest clock (i.e., the system clock.)

Figure 8:
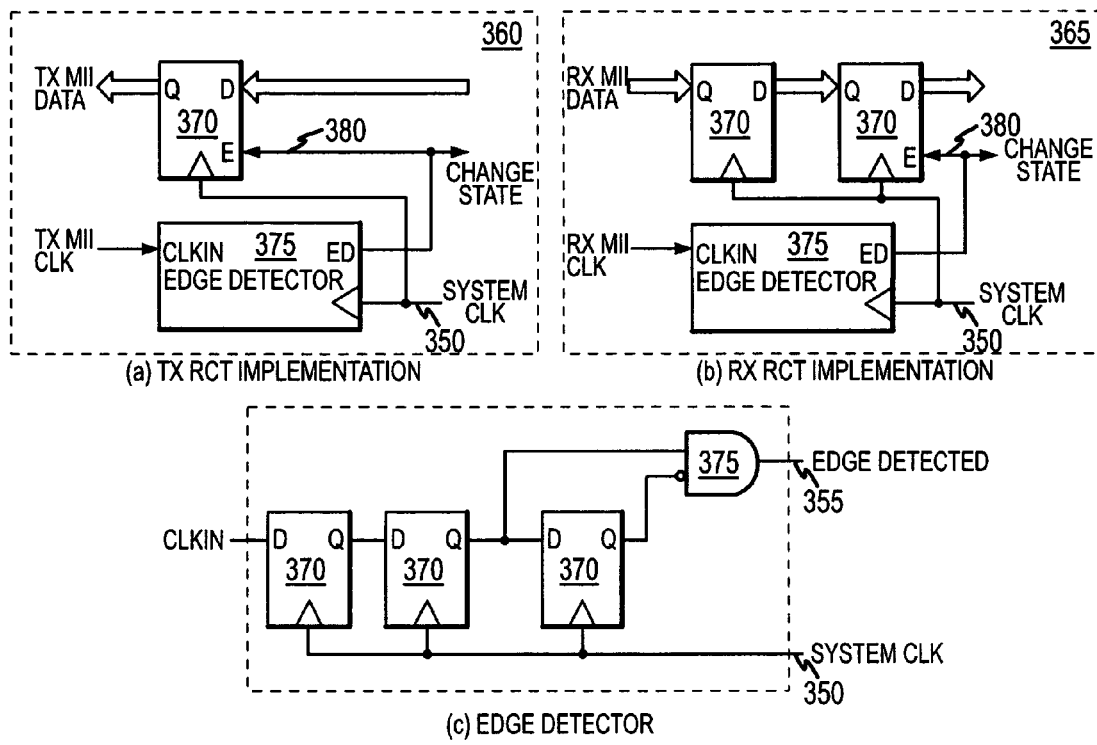
FIG. 8(a) depicts a first hardware implementation of a unified clock scheme.
FIG. 8(b) depicts a second hardware implementation of a unified clock scheme.
FIG. 8(c) depicts a hardware implementation of an edge detector suitable for use in the first and second hardware implementations of FIGS. 8(a) and 8(b).

FIGS. 8(*a*) and 8(*b*) depict hardware implementations of the UCS. FIG. 8(*a*) depicts the UCS in a first implementation, namely a "TX RCT" implementation. ("RCT" stand for "reduced clock tree." A clock tree, as known to those skilled in the art, depicts the logic of a clock distribution.) FIG. 8(*b*) depicts the UCS in a second implementation, specifically an "RX RCT" implementation. "RCT" stands for "Reduced Clock Tree." The term "clock tree" is usually used by ASIC engineers to depict the clock distribution logics. RCT is a simplified clock tree employed in our implementation. Both implementations employ two elements, namely a flip-flop 370 and an edge detector 375. Typically, the flip-flop includes an enable pin 380 permitting it to be activated or deactivated as desired. In the present embodiment, the system clock 350 synchronizes each flip-flop 370.

The edge detector 375 shown in FIGS. 8(*a*) and 8(*b*) is also synchronized to the system clock 350. The edge detector accepts the MII clock as an input, and generates an output signal 355 when a rising edge of the MII clock 335, 340 is detected.

All the elements of the MAC's finite state machine may be represented as one or more flip-flops 370. Each such flip-flop accepts an edge detection signal 355 as an input to its enable pin 380. That is, the output of the edge detector 375 is used as an input to the enable pin of each flip-flop. Accordingly, each flip-flop (and thus each finite state machine represented by the one or more flip-flops 370) changes state only on the rising edge of the MII clock 335, 340.

FIG. 8(*c*) shows one exemplary implementation of the edge detector 375. The detector may be composed of a cascade of three flip-flops 370. Each flip-flop is synchronized with the system clock 350; the data input of the first flip-flop is the MII clock. When the second flip-flop is high and the third is low, the edge-detection signal 355 is asserted. The first flip-flop is inserted to reduce the probability of metastability propagation.

The UCS provides identical behaviors to the MAC controller 260 operating with MII clock inputs 335, 340, except that MII signals may experience a maximum of 8 nanoseconds jitter since the MAC controller and the MII clock may have a maximum timing distance of 8 nanoseconds between clock edges. Although jitter could pose timing issues in an analog circuit, it typically is not recognizable in the digital domain if the clock tree can meet the setup and hold time constraints of the external interface. The UCS offers a timing margin of 32 nanoseconds during 100 Mb/s data transfer, which is typically sufficient to meet setup and hold time constraints of the MII interface.

C. Protocol Engine

As shown in FIG. 2, the architecture of the exemplary embodiment 200 typically does not use a TCP/IP communication protocol, but instead may use a proprietary protocol referred to herein as "LeanTCP." LeanTCP is described in greater detail in U.S. patent application Ser. No. 11/187,762, entitled "Low-Level Communication Layers and Device Employing Same," which is incorporated herein by reference in its entirety. It should be noted that alternative embodiments of the present invention may use protocols other than LeanTCP, including in some cases TCP/IP or other protocols known to those skilled in the art.

Although using TCP/IP stack offers many advantages, it is not suitable for certain exemplary embodiments of the present invention. Hardware implementations of the TCP/IP stack may be impractical, and software implementations typically require a high-performance processor to process packets at the gigabit line rate (i.e., theoretical maximum network data transmission rate). Although a TCP/IP protocol handler or stack may be implemented as a hardware solution for server 100 or router applications 130, the hardware cost may prove prohibitive for use in a home network 115. LeanTCP is effectively a streamlined TCP/IP protocol providing reliable services like TCP/IP. However, LeanTCP is much "lighter" than TCP/IP, insofar as the protocol stack 235 contains less data. For example, the frame reordering and flow control capabilities of standard TCP/IP typically are useful only for routers in a wide-area network. Thus, the information for these capabilities is not included in the LeanTCP protocol. Similarly, since only a MAC address is used to deliver packets in level 2 switching of a local-area network, IP address information is not included in LeanTCP. The device driver 230 may render the local command issued by the application 225 or host 220 into the LeanTCP protocol 235, effectively serving to add the appropriate protocol header to the command. The command is generally embedded in the payload portion of the packet.

The protocol engine 265 (see FIG. 5) may be thought of as a hardware implementation of the LeanTCP stack. As previously discussed, the protocol engine is in charge of establishing and terminating connections between a host 220 and the exemplary network disk controller 210, checking the validity of incoming packets, retransmitting lost packets, and managing the information of remote hosts.

To operate effectively and minimize latency (and thus provide performance equivalent to a local disk controller 245), the protocol engine 265 must process packets at the gigabit line rate without buffering packets. Accordingly, a fast and compact lookup engine is useful in the protocol engine 265. Because each pipelined connection is independent from one another, the protocol engine 265 must handle each packet separately based on the connection identified by the source MAC address 385 and the port number 390 included in the header. The lookup engine generally searches a table 380 for an identifier to which the source MAC address 385 and port number 390 are uniquely mapped. Because this process is a form of table scanning requiring many memory accesses, the lookup engine often is the bottleneck of the protocol engine 265. In one embodiment of the protocol engine and the present invention, the lookup engine completes its lookup within 64 ns, which corresponds to eight system clock cycles. Within the 64 ns window the entire lookup is completed, from the end of the port number field 390 to the start of payload.

The lookup engine may complete its task within the designated timeframe by employing a hashing routine. For example, the lookup engine may compute a hash function on the source MAC address 385 and the port number 390, and use the resulting hash value as an identifier stored in the lookup table 380.

As another alternative, a content addressable memory (CAM) might be employed in the lookup engine. The source MAC address 385 and port number 390 may be stored in a CAM and the corresponding address used as the identifier. As a benefit, the CAM may search the lookup table 380 in a single cycle since it compares a given input against all the entries in parallel. However, a CAM is often expensive, and thus may not be suitable for inclusion in a lookup engine designed for or used in environments where cost is a factor.

By employing a tagging scheme as used in tag switching, a relatively simple and fast lookup engine can be successfully implemented. When a host 220 requests a connection be established to the exemplary network disk controller 210, the protocol engine 265 may allocate a 16-bit tag 395 and acknowledge it to the host via a reply packet. (Alternative embodiments may vary the number of bits in the tag.) After initializing the connection, the protocol engine 265 does not perform a lookup operation based on the source MAC address 385 and port number 390 to obtain an identifier. Rather, the protocol engine uses the tag 395 carried in each packet header as an identifier to match the packet to the host 220 transmitting the packet. As soon as the portion of the header bearing the tag arrives at the protocol engine 265, the protocol engine can immediately find an identifier and match the packet to a host. In other words, the tag 395 effectively yields the address in the lookup table.

Although using the tag scheme simplifies the lookup process, in some network environments 115 such a scheme may expose the improved network disk controller 210 to operational dangers. For example, a connection might be corrupted by incorrectly tagged frames generated through malfunction of a host 220 or by a malicious host. If an abnormal frame having the same tag 395 as a normal connection incidentally updates the sequence number of the connection, the connection may be corrupted. To prevent this, the lookup engine typically verifies the tag of each received frame.

Figure 9:
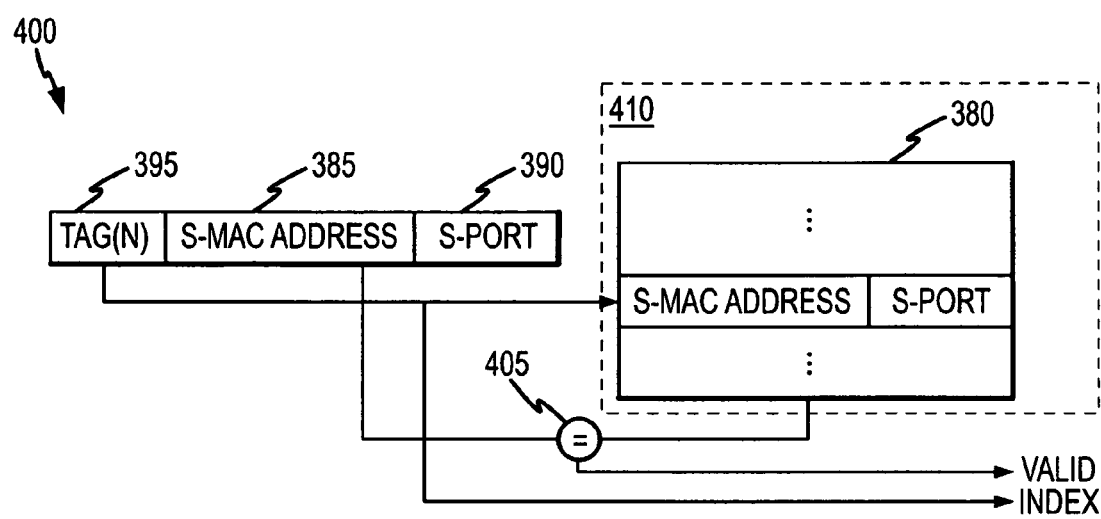
FIG. 9 depicts a packet header and a lookup table, each storing lookup information.

FIG. 9 illustrates a packet header 400 and lookup table 380, as used by an exemplary lookup engine. The lookup engine may be implemented with a static random access memory (SRAM) 410 and a comparator 405. (Alternative types of random access memory may also be employed in lieu of, or in addition to, SRAM.) When the exemplary network disk controller 210 receives a connection establishment request from a host 220, the lookup engine may allocate a new tag 395 and store both source MAC address 385 and source port number 390 in the SRAM 410 at the address corresponding to the tag. During processing of ordinary data frames, the lookup engine may compare the source MAC address and port number against data retrieved from the SRAM at the tag address to verify validity of the frame. The total operation time for one embodiment of a lookup engine operating in this manner is 24 ns. This includes all operations necessary to process an address cycle, a data cycle, and a compare cycle, and is within the exemplary timing budget of 64 ns.

D. Command Processing Engine

The command processing engine 280, first discussed above with respect to FIG. 5, is typically composed of a command queue 320, a write buffer 285, a read buffer 275, a parser 315, a command executer 330, and a retransmission manager 305. The command processing engine generally executes disk I/O commands requested by remote hosts 220. Before processing the data payload of a given packet, the command processing engine reads state information (i.e., an identifier) within the address (i.e., an identifier) passed from the protocol engine 265 and stored in a state memory. The state information indicates the operation mode requested by the host 220 and to be executed by the exemplary network disk controller 210. That is, the state information indicates whether the exemplary network disk controller is to operate in a command mode or data mode.

Initially, the command processing engine 280 is in the command mode. In this mode, the command processing engine treats all received payloads as commands, sending all payloads to the parser 315 for analysis. After the parsing process, the command is queued in the command queue 320 (or command memory 325) and waits until the command executer 330 is idle. The command is then executed by the command executer.

Receipt of a write command changes the command processing engine's state from the command mode to the data mode. In the data mode, all subsequent payloads in the packet or packet string are saved in the write buffer 285 for writing to the storage medium 205. After all associated payloads are written to the storage medium, the state returns to the command mode.

In general, the command processing engine 285 is implemented in hardware, although alternative embodiments may implement the engine (or, for the matter, the protocol engine 265) as software. The command processing engine can be adapted to recognize and operate with new ATA/ATAPI devices. That is, by modifying the device driver 230 employed by the exemplary embodiment, the improved network disk controller 220 can support a new device.

Figure 10:
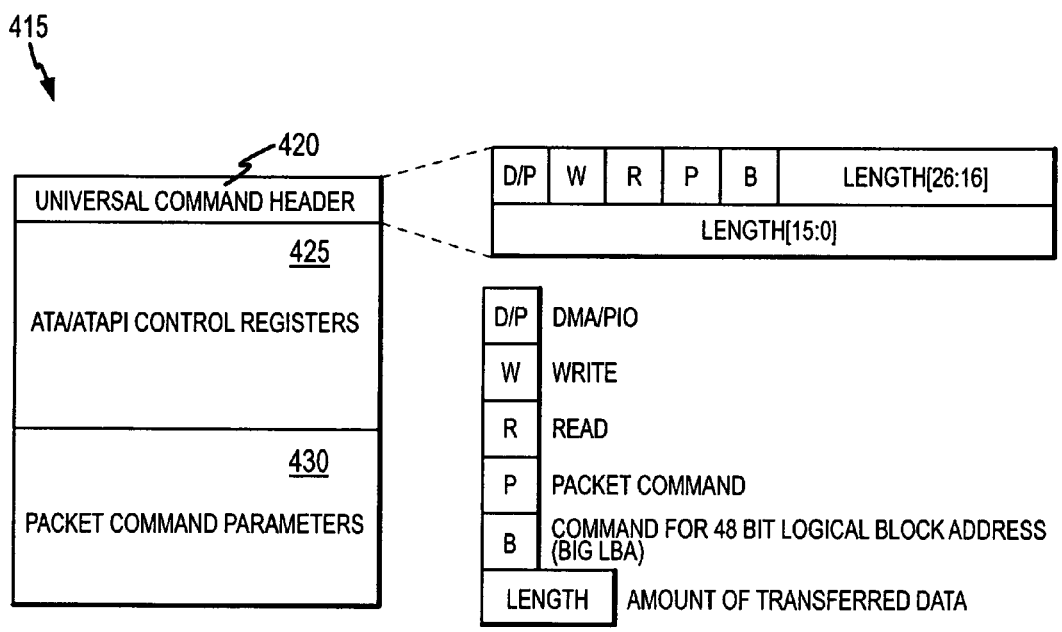
FIG. 10 depicts a unique command format employed by certain embodiments of the present invention.

A specially devised command format is illustrated in FIG. 10. This command format is referred to herein as the Universal Command Form (UCF) 415, and offers flexibility to the command processing engine 280. Although the exemplary embodiment employs the UCF, alternative embodiments may employ different command formats.

Many prior art network storage architectures use SCSI commands for communication across the network 115 and convert SCSI commands to storage-native commands to be executed by prior art network disk controllers 145. The exemplary network disk controller 210, however, employs native ATA/ATAPI commands (or another suitable local storage medium command) received across the network 115. As defined in the ATA/ATAPI standard, to execute an ATA/ATAPI command, a host 220 interacts with an ATA/ATAPI device through writing or reading registers located in the device. Since the ATA/ATAPI control registers and packet command parameters fields of the UCF 415 directly represent values of writing or reading registers, UCF is able to support many different ATA/ATAPI commands.

However, despite UCF's 415 extensive ability to support many ATA/ATAPI commands (or other suitable storage medium local commands), its flexibility may be limited by the analysis ability of the parser 315 because the command executer 330 may control other storage blocks depending on the analysis results provided by the parser (such as the amount of data being read or written and the type of command being executed). To overcome this limitation, the exemplary embodiment may recognize an additional header field 420 in the UCF 415. The additional header field may summarize the operations/processes required by the associated command transmitted in the packet. The device driver 230 operating on the host 220 may parse commands and summarize the results in the header. The universal parser 315 may then refer only to the additional UCF header field 420 without concern for the contents of the ATA/ATAPI control registers 425 and packet command parameters fields 430. Thus, the universal parser (and, accordingly, the command processing engine 280 of which the universal parser is a part) may support any command so long as it fits into the format shown in FIG. 10. Accordingly, the UCF is able to represent all kinds of ATA/ATAPI protocols.

Furthermore, the compact nature of UCF 415 permits the implementation of a streamlined universal parser 315, which may be implemented in a simple finite state machine. Generally, a parser is implemented by using a table describing operation processes required to be executed by an I/O command in a unique table entry. Alternatively, the parser may be a finite state machine having different control logic for each command. Hence, the more devices supported by the parser, the larger the table required or the more complex the finite state machine must be. However, in the present embodiment a universal parser 315 can be realized with a much smaller table or less complex hardware, because the device driver 230 (implemented at the host 220, and typically on the host's operating system) performs the majority of the parsing processes when setting up the additional header field. Accordingly, the universal parser's operations are reduced, and the complexity of the universal parser may be likewise reduced.

Intuitively, it may appear that executing at least a portion of the parsing process by the device driver 230 could seriously increase the host's processor utilization. Generally, a device driver 230 of a local disk controller 245 also should parse commands to perform different operations such as setting registers and allocating reading memory for each command. The overhead incurred by the UCF 415 is just one memory access for header of 4 bytes, which is negligible. Accordingly, the additional processor utilization by the host 220 is also minimal.

As previously mentioned, LeanTCP is a connection-oriented protocol. Generally, in the LeanTCP protocol a protocol stack is implemented as a layered architecture where each layer is not aware of the status of other layers. The protocol checks for lost packets and, if necessary, orders retransmission of lost packets. By contrast, the application for which the packets are intended never need check for lost packets. Indeed, the loss of packets is in some ways transparent to applications, insofar as the lost packets are retransmitted by the protocol without intervention by the application. When LeanTCP is implemented in a layered architecture, the protocol engine retransmits lost packets without any action by the command processing engine.

Figure 11:
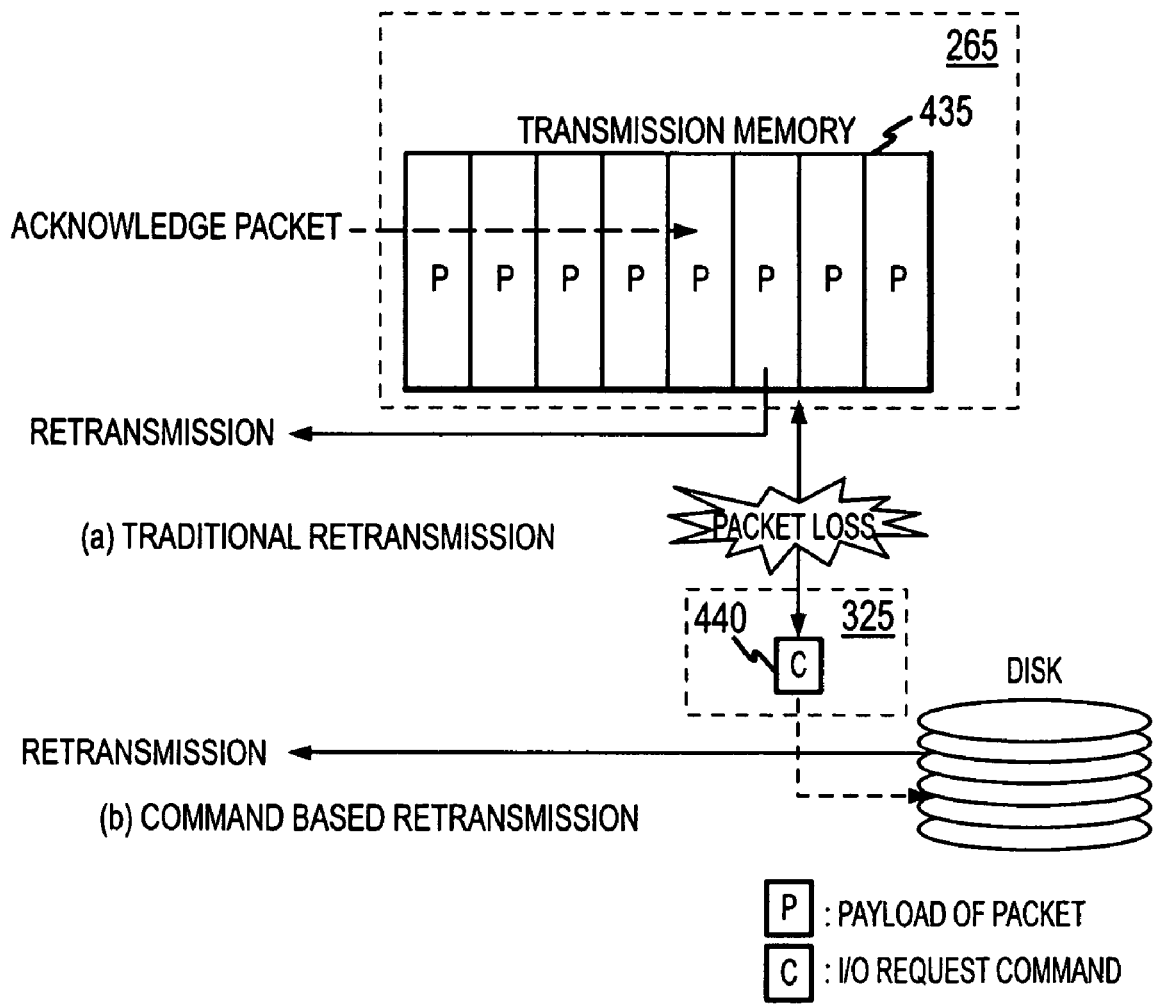
FIG. 11(a) depicts a first retransmission scheme employed by certain embodiments of the present invention.
FIG. 11(b) depicts a second retransmission scheme employed by certain embodiments of the present invention.

Such a layered architecture requires may require a relatively large amount of memory. As shown in FIG. 11(a), the protocol engine 265 (or other element of the network disk controller 210) may hold all transmitted packets in a transmission memory 435 until receiving an acknowledgement packet, to minimize the time necessary to retransmit a lost packet. In some such implementations, many megabytes of memory would be required, since the transmission memory 435 would have to be large enough to hold the maximum data packet size multiplied by the maximum number of supporting hosts. It should be noted that the transmission memory 435 may be combined with any other memory discussed herein that is accessible to the network disk controller 210.

To reduce the memory requirement to an acceptable range, the command processing engine 280 may postpone the issue of a subsequent command until the protocol engine 265 receives the acknowledgement packet corresponding the last packet transmitted by the command processing engine. In this case, the size of required memory becomes tens of kilobytes, equal to the maximum transfer size of requested data.

Alternatively, in a new data retransmission scheme called Command Based Retransmission (CBR), illustrated in FIG. 11(b), the protocol engine 265 does not save any transmitted packets. Instead, the command processing engine 285 saves only the last-executed command 440. The last-executed command 440 may be saved, for example, in the command memory 325, the transmission memory 435, or another memory. When packets are lost, the command processing engine 280 may again queue the saved command into the command queue for re-execution by, for example, the command executer, and the protocol engine 265 may accordingly retransmit the lost packets using data retrieved from the storage medium 205. The memory required by CBR is typically on the order of tens of bytes, or the command size times the number of maximum supporting hosts. Re-execution of the command may include a read operation on the storage medium 205, as well as all operations typically associated with transmitting a packet from the network disk controller 205 to the host 220 (such as encapsulation of a header and so forth).

When a packet is lost, CBR typically experiences increased operation time incurred through the required additional storage medium 205 operation, which is slower typically than memory access by several orders of magnitude. However, since the possibility of packet loss is usually very low in a local area network 115 and the storage medium's operation time is less than the retransmission time-out value of hundreds of milliseconds, the performance degradation is negligible from a practical point of view.

V. Implementation and Measurement

In order to benchmark and provide real-world test data for the exemplary network disk controller's performance, an exemplary network disk controller was tested in two different evaluation environments. The first environment facilitated benchmarking the performance of the exemplary network disk controller itself, without accounting for network delays. For comparison, the performance of three other devices, namely a local disk controller, an USB2.0 bulk storage controller, and 1 Gb/s network-attached storage controller (NAS) implemented in an embedded processor, were also measured. To minimize network delays, the exemplary network disk controller and storage medium were directly connected to the host, with no intervening network switches.

The second environment facilitated examining how network delays may affect the exemplary network disk controller's performance. During successive operations of the exemplary network disk controller, the number of network switches placed between the host and network disk controller, in the network, was scaled up. A Pentium 4 2.4 Hz desktop computer with 512 Mbytes of main memory and an Intel PRO/1000 MT Desktop Adapter were employed in the second environment as a host. The performance of the exemplary network disk controller was measured by running a benchmarking program operating on a WINDOWS 2000 operating system.

Figure 12:
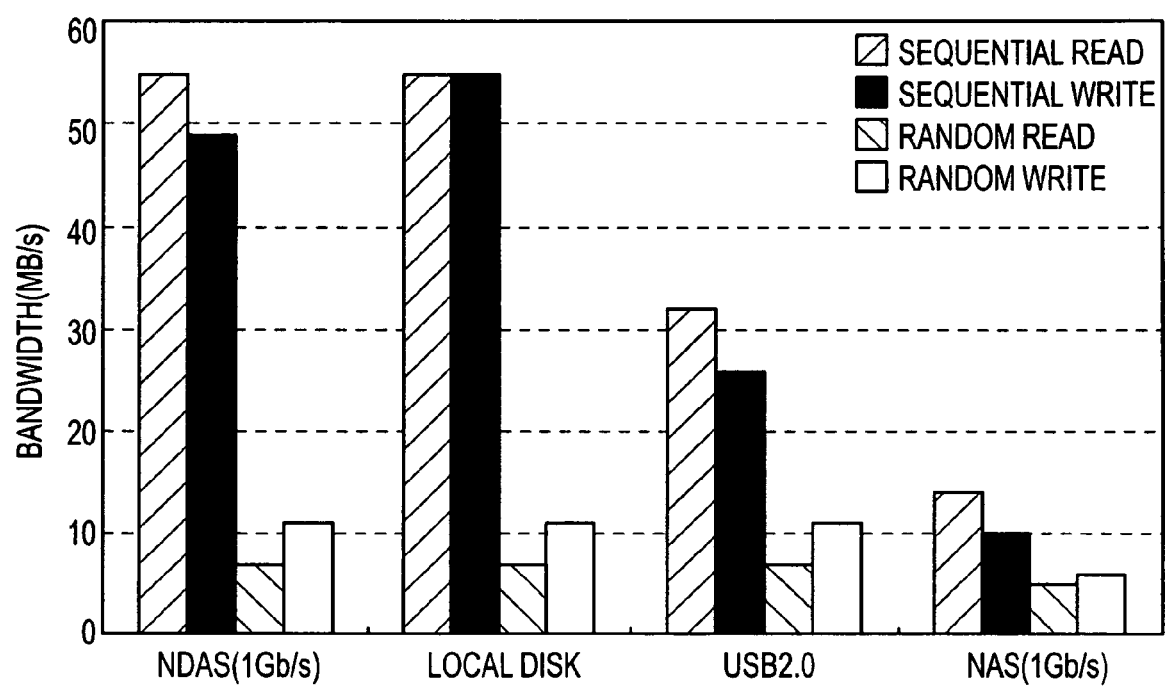
FIG. 12 is a first graph of the bandwidth available when using an exemplary network disk controller, compared to prior art controllers.

FIG. 12 and Table 1, below, show the performances of the exemplary network disk controller. As shown in Table 1 and FIG. 12, the measured performance of the exemplary network disk controller was competitive to that of a local disk controller. The sequential read bandwidth of the exemplary network disk controller was 55 MB/s. The sequential write bandwidth of the exemplary network disk controller was 49 MB/s. The random read bandwidth of the exemplary network disk controller was 7 MB/s. The random write bandwidth of the exemplary network disk controller was 11 MB/s. Finally, the average access time of the exemplary network disk controller was 7 ms.

Each tracked performance was approximately equal to the equivalent performance of the local disk controller, with the exception oft the sequential write bandwidth, which was 10.9% quicker when performed by the local disk controller. However, this degradation likely resulted from the operation of the host's network interface card. In a performance test using a server network interface card, the sequential write bandwidth of the exemplary network disk controller was approximately identical to that of the local disk controller. Generally, network devices for desktops may not be optimized for uploading data, which in turn may affect the write performance of the exemplary network disk controller.

TABLE 1

| | Average Access Time | | | |
| --- | --- | --- | --- | --- |
| | Exemplary Embodiment (1 Gb/s) | Local disk | USB2.0 | NAS (1 Gb/s) |
| Average Access Time (ms) | 7 | 7 | 8 | 9 |

Figure 13:
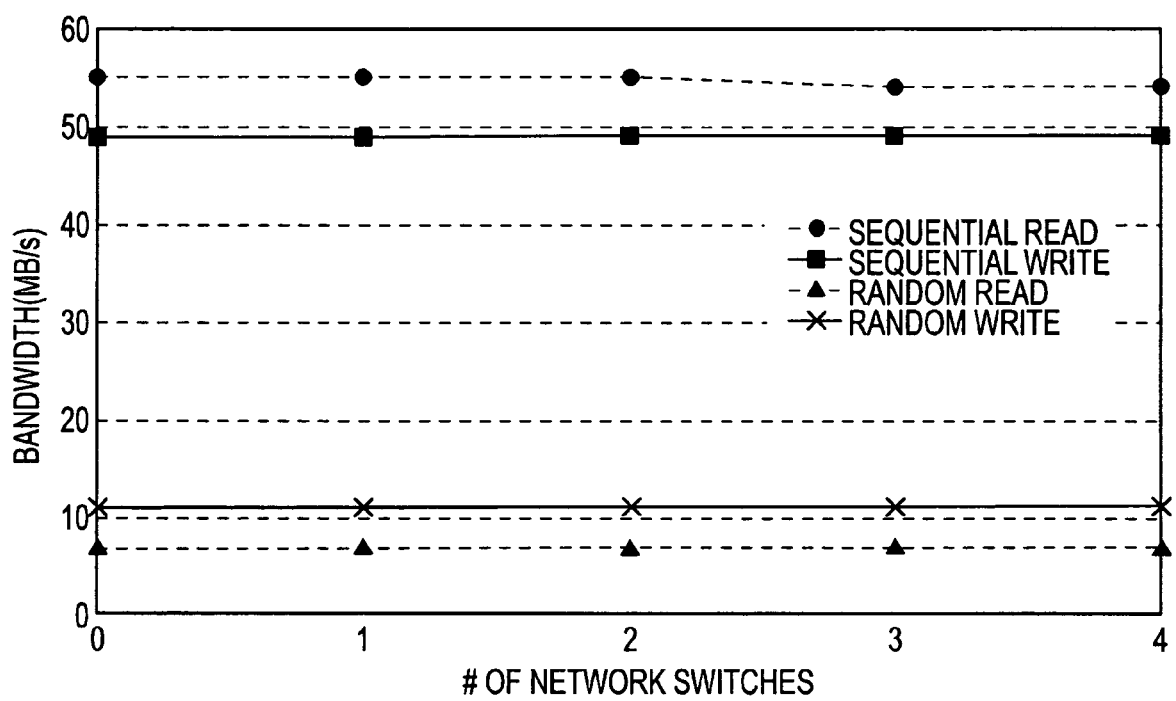
FIG. 13 is a second graph of the bandwidth available when using an exemplary network disk controller, graphed against a number of network switches in a network.

FIG. 13 plots the bandwidth available in a number of operations performed by the network disk controller versus the number of network switches in the network. Generally, network delay does not affect the exemplary network disk controller's performance unless more than two network switches are present. Even then, performance degradation was relatively minimal. For example, in three and four network switch configurations, the bandwidth of the exemplary network disk controller's sequential read pattern was reduced by 1.8% (approximately 1 MB/s), while the bandwidths of other patterns and the average access time experienced no degradation. Accordingly, the exemplary network disk controller yields a performance competitive to a local disk controller in real-world home network environments.

Figure 14:
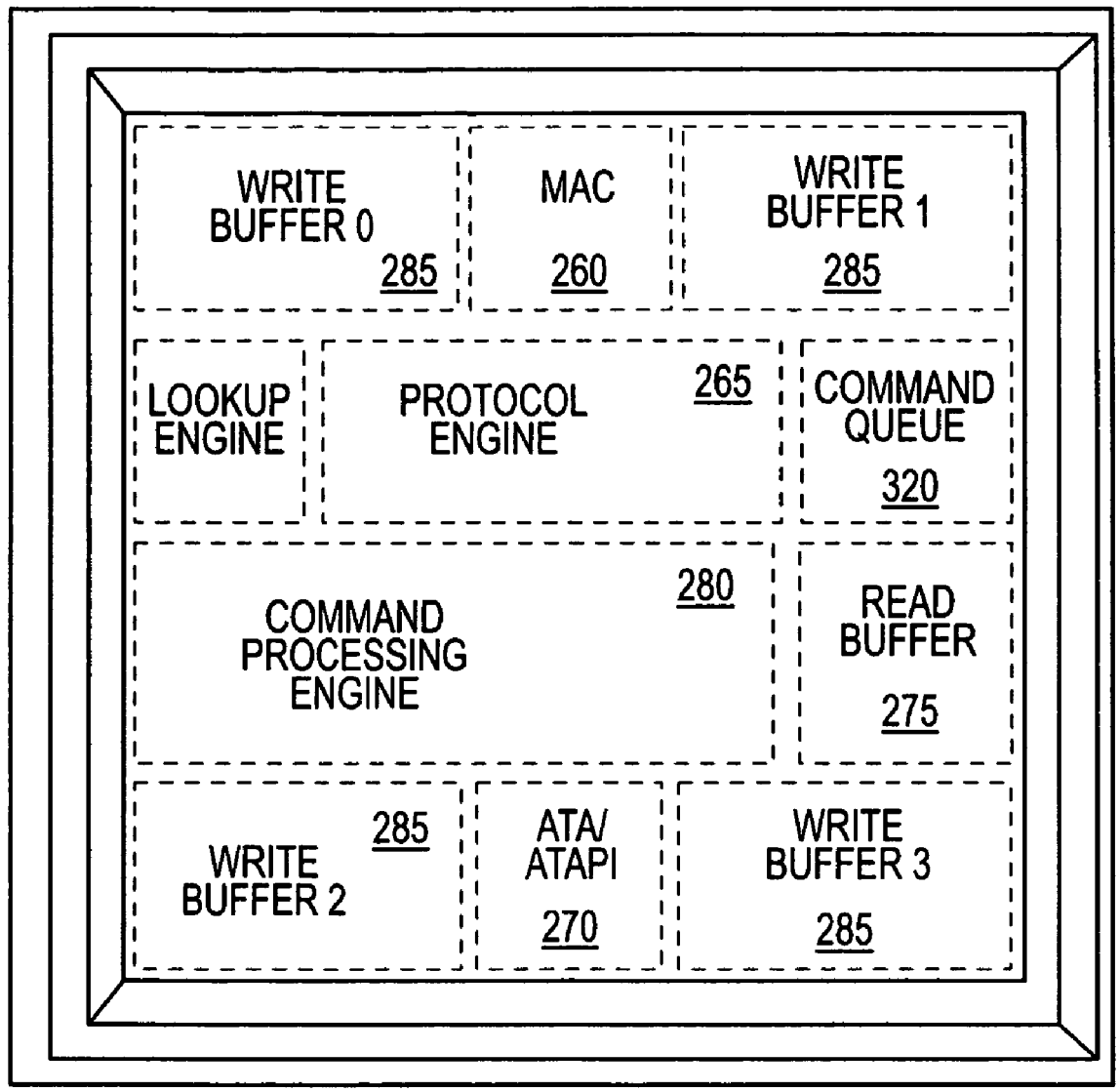
FIG. 14 is an illustration of a die implementing the exemplary network disk controller.

One exemplary embodiment of the exemplary network disk controller LSI is fabricated with a 0.18-um (micrometer) six-layer metal CMOS process and housed in a 128-pin plastic quad flat package. The clock speed of the exemplary controller is 125 MHz. The exemplary network disk controller consumes 266 milli-watts of power. FIG. 14 is a chip photograph of one exemplary embodiment of the exemplary network disk controller LSI; chip features are summarized in table 2.

TABLE 2

| Chip summary | |
| --- | --- |
| Process Technology | 0.18 um CMOS 6-Metal |
| Power Supply | 3.3 V (I/O), 1.8 V (Internal) |

TABLE 2-continued

Chip summary

| | |
|---|---|
| Operating Frequency | 125 MHz (system clock) |
| Power Consumption | <266 mW |
| Transistor Counts | 130K Logic Gates |
| | 69 KByte SRAM |
| Die Size | 4 mm × 4 mm |
| Package | 128 pin QFP |

VI. Ethernet/SATA Controller

Yet another embodiment of the present invention may take the form of a remote storage device controller operable in multiple modes. For example, and as shown generally in FIGS. 15-20, an enhanced network disk controller 500 may include a number of sub-modules, similar to the improved network disk controller 210 discussed previously. The enhanced network disk controller 500 may include all the functionality discussed above with respect to the improved network disk controller 210, as well as the ability to facilitate communication between a remote storage device and a second host through a serial advanced technology attachment (SATA) bus. It should be noted the enhanced network disk controller 500 may attach to either an internal SATA bus, or a so-called external SATA ("e-SATA") bus.

A. Overview

Figure 15:
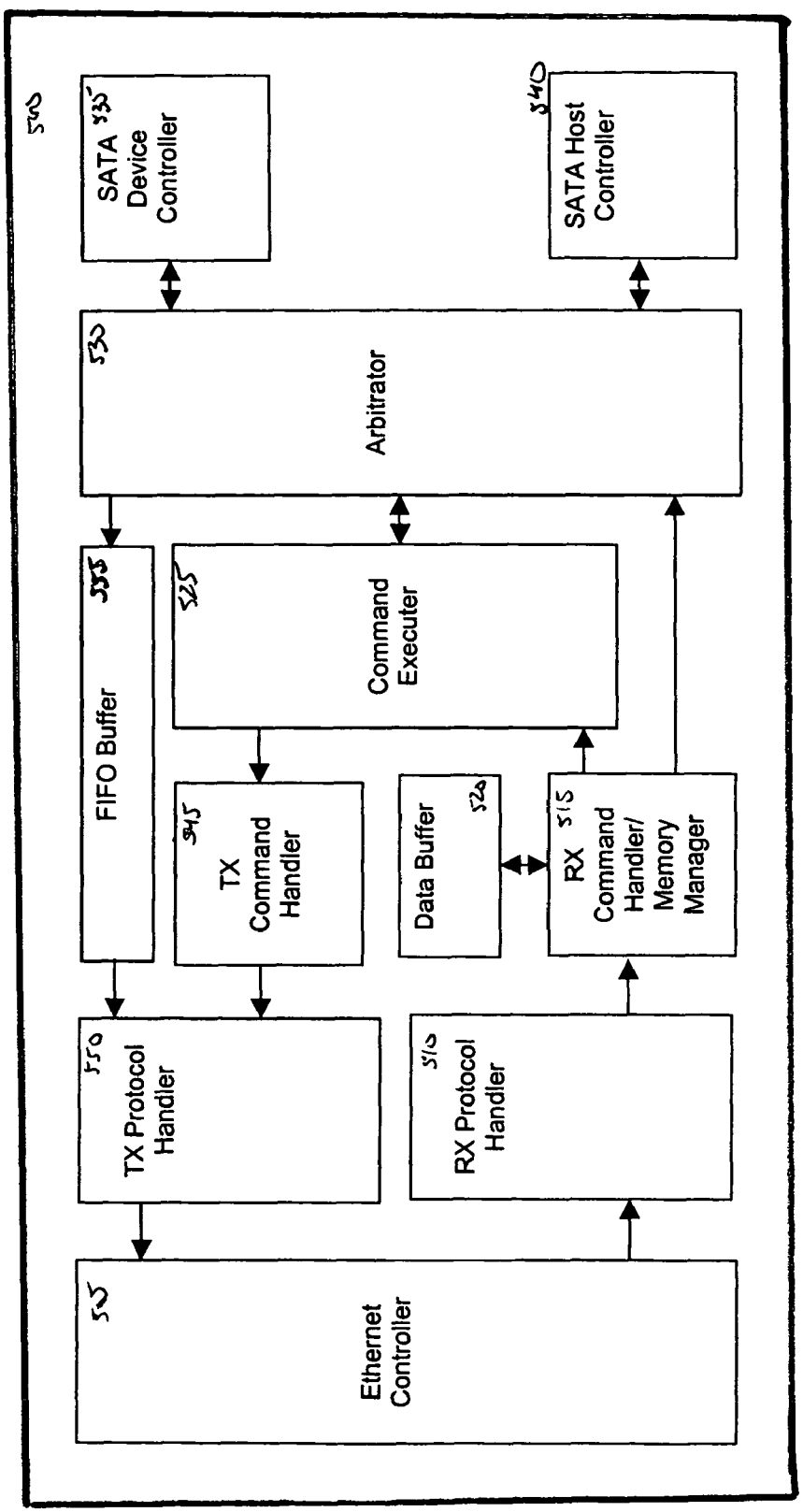
FIG. 15 depicts an exemplary enhanced network disk controller in accordance with a further embodiment of the present invention.

FIG. 15 generally depicts one example of the enhanced network disk controller 500. The enhanced network disk controller 500 may include a set of modules 505-555, each responsible for a different facet of the controller's operation. It should be understood that the controller 500 shown in FIG. 15 is exemplary. Accordingly, alternative embodiments of the present invention may add, omit, or combine modules and/or functionality without departing from the spirit or scope of the invention.

The Ethernet controller 505 generally performs the operations detailed above in Section IV.B., entitled "Ethernet MAC Controller." The Ethernet controller 505, to recap, generally handles incoming and outgoing packets sent across a network 115. The Ethernet controller 505, for example, may accept packets issued by a host 110 intended for the remote storage device, and may likewise accept packets issued from the remote storage device (or by the enhanced network disk controller 500 itself) intended for the remote host. Among other functionality, the Ethernet controller 505 may recognize and process packets having MAC sublayer data. It should be noted the Ethernet controller 505 is one exemplary controller; other network controllers may be substituted.

Inbound packets (that is, packets originating at a host 110) are passed to the reception protocol handler 510. The reception protocol handler 510 generally decapsulates the protocol header from the command and/or data portions of a packet, as described above with respect to the decapsulator 290. The reception protocol header 510 may also perform the operations of the protocol header manager 295, and may optionally perform the functions of the connection manager 300.

The non-protocol segments of a packet are passed from the reception protocol handler 510 to the reception command handler/memory manager 515. The reception command handler 515 typically operates to extract a command and parse the command in a manner similar to the operation of the universal parser 315. The reception command handler may store a packet's payload in a data buffer 520. The reception command handler 515 generally controls the operation of the data buffer 520 as well. For example, the reception control handler 515 may control when data to be written to the remote storage medium move in or out of the data buffer 520. Among other operations, the reception command handler 515 may separate commands in a packet from data intended for the remote storage medium.

Commands are passed from the reception command handler 515 to the command executer 525. Generally, the command executer 525 may retrieve (or otherwise accept) the command from the command memory, execute the command, and instruct the SATA device controller as to the reading or writing of data initiated by the command, which may involve the write buffer 285 passing at least a portion of a payload to the SATA device controller. In short, the command executer 525 may fulfill any or all of the functions described with respect to the command executer 330 of the improved network disk control 210, above.

By contrast, data is generally sent from the reception control handler 515 (or, in alternative embodiments, from the data buffer 520) to the arbitrator 530. The arbitrator 530 routes data to the SATA device controller 535. The arbitrator 530 may have additional functionality, as described below. For example, the arbitrator 530 also controls communications/transmissions between the second host and the remote storage medium. Such communications are routed from the SATA host controller 540, to the arbitrator 530, through the SATA device controller 535, and ultimately to the remote storage medium.

In certain cases, a command may be sent from the enhanced network disk controller 500 to the remote host. When this occurs, the command executer 525 passes the command to the transmission command handler 545. The transmission command handler 545 may packetize the command and format it as necessary. The command is then passed to the transmission protocol handler 550, which may attach the packetized command to a protocol header. Further, the transmission protocol handler 550 may bundle the command and protocol header in one or more packets with read data from the remote storage medium, which is generally passed to the transmission protocol handler 550 through the read buffer 555. The transmission protocol handler 550 generally corresponds to, and performs functions similar or identical to, those of the encapsulator module 310. Similarly, the read buffer 555 generally corresponds to, and operates as, the read buffer 275 of the improved network disk controller 210.

One or more outbound packets (i.e., packets being transmitted across the network 115, for example to a remote host 110) may be passed from the transmission protocol handler 550 to the Ethernet controller 505 for transmission across the network.

B. Arbitrator

At a broad level, the arbitrator 530 is responsible for controlling data flow to and from the remote storage device. The arbitrator 530 coordinates data packets sent by or to the remote host and the second host, and ultimately, at certain levels, the flow of such packets between the Ethernet controller 505 and remote storage device, and between the second host (through the SATA host controller 540) and remote storage device. Accordingly, two data paths may be defined in the exemplary enhanced network disk controller 500: one from the Ethernet controller 505 to the SATA device controller 535; and one from the SATA host controller 540 to the SATA device controller.

The SATA device controller 535 operates on a single bus to communicate with the remote storage device. Thus, the remote storage device can communicate with only one of the Ethernet controller 505 and SATA host controller 540 at any given time. Were the remote storage medium to receive data requests or writes from both the Ethernet and SATA host controller simultaneously, the medium could confuse the various commands. This, in turn, could lead to data corruption (either in the writing or transmission of data). For example, were the remote storage device to accept multiple simultaneous communications, it may result in tampering with data being written by one or the other hosts. This might also occur, for example, were the SATA host controller 540 replaced by a second Ethernet controller.

However, traffic through the SATA device controller 535 and across the SATA bus to the remote storage device is controlled by the arbitrator 530. The arbitrator 530 permits the controller module 505, 540 that requests a connection (or sends a packet) to control the SATA bus between the SATA device controller 535 and the remote storage device. For example, if a remote host, via the Ethernet controller 505, requests communication with the remote storage medium when the medium is idle, the arbitrator 530 assigns control of the SATA device controller 535 and the SATA bus to the Ethernet controller. If the second host, via the SATA host controller 540, attempts to communicate with the remote storage medium before the remote host releases the medium, the arbitrator will deny packets from the SATA host controller associated with the second host.

The arbitrator 530 accomplishes this by continually checking a signal line (or by simply checking the SATA bus itself) to determine the present owner of the SATA device controller and associated bus. Each controller 505, 540 requests access to the SATA device controller 535 and SATA bus by transmitting an access request signal to the arbitrator 530 through the signal line. The access request signal is transmitted across the signal line to the arbitrator 530 until the controller is finished accessing the remote storage medium. Only one controller module may access the signal line at any given time.

Not until the signal line indicates no controller 505, 540 owns the bus will the arbitrator permit another host (via its controller) to interact with the remote storage medium. Generally speaking, the arbitrator 530 ignores and blocks all requests originating from a non-owning control module 505, 540 from reaching the SATA device controller 535. Thus, once the SATA device controller 535 and SATA bus are free, the controller 505, 540 previously blocked by the arbitrator 530 must retransmit its packet(s).

In alternative embodiments, the arbitrator 530 may be associated with a memory (not shown) in which packets originating from a non-owning controller 505, 540 may be stored. In this manner, the arbitrator 530 may manage a queue and transmit packets (or simply connection requests) on a priority basis. The priority basis may be a first-in, first-out scheme, or connection requests may include a priority flag set by either the originating controller or host.

In alternate embodiments, the arbitrator may have access to multiple signal lines. For example, each controller module 505, 540 may have a dedicated signal line, and the arbitrator may permit the first controller to request access through its dedicated signal line to communicate with the remote storage medium.

Thus, the arbitrator module 530 effectively acts to control traffic to the SATA device controller 535 and associated remote storage medium. The arbitrator may govern the usage of the remote storage medium in this manner in order to prevent data from being corrupted, overwritten, or multiple data accesses (either read or write accesses) from being received or executed by the medium. The arbitrator may impose a priority scheme on the various controllers, either the first-come, first-served implementation described herein or another scheme. For example, the arbitrator 530 may implement a priority flag scheme as described above, or may determine an estimated access time for each access request received (for example, from the size or number of packets in a data transmission) and prioritize access based on the time required to complete an operation.

The arbitrator 530 may also act as (or include) a multiplexer to permit multiple hosts to be connected thereto through multiple SATA host controllers 540. In this way, more than one host may access the enhanced network controller 500 through a SATA connection.

C. Operational Modes

Figure 16:
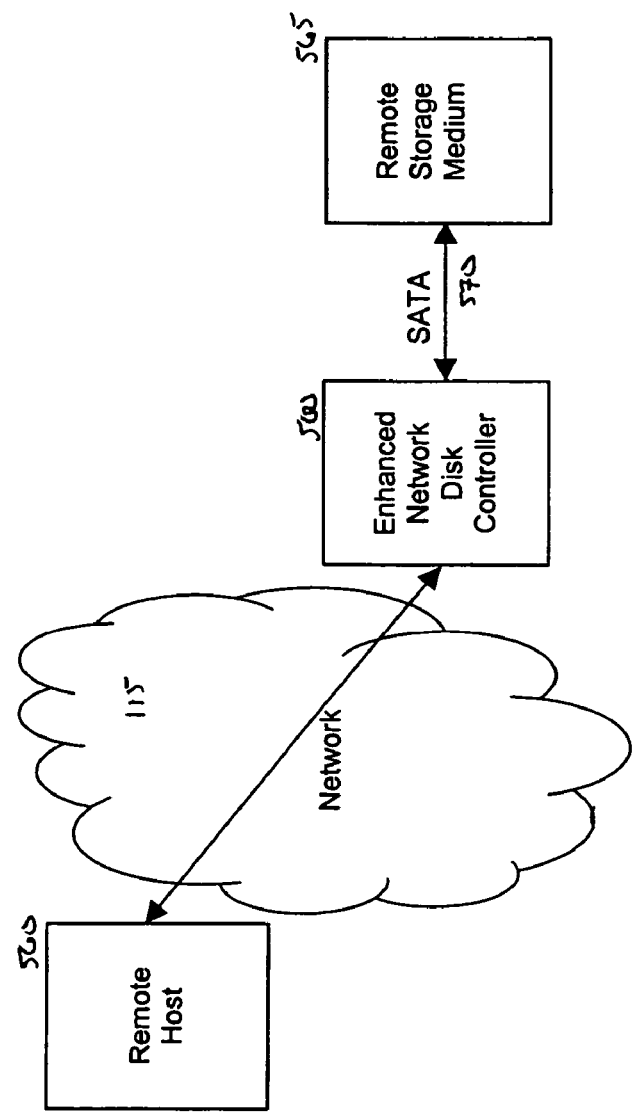
FIG. 16 depicts a first exemplary operating environment for the enhanced network disk controller of FIG. 15.
Figure 17:
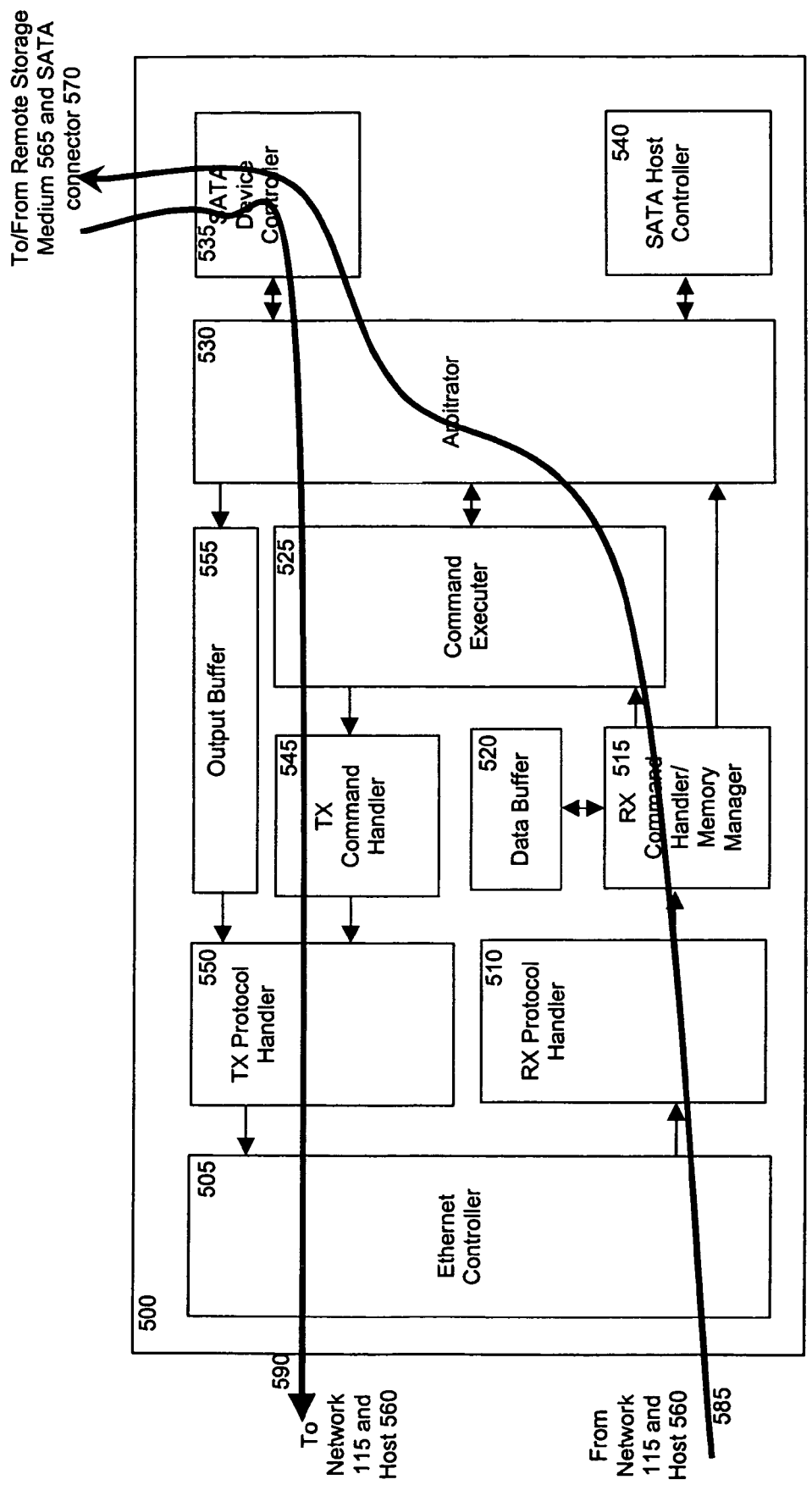
FIG. 17 depicts a first set of data paths corresponding to the enhanced network disk controller of FIG. 15 operating in the operating environment of FIG. 16.

The enhanced network storage controller 500 may operate in a variety of modes and a number of operating environments. For example and as shown in FIGS. 16 and 17, the enhanced network storage controller 500 may mimic the operating environment and operational mode of the improved network disk controller 210 discussed above. In such an operating environment (FIG. 16), the enhanced network disk controller 500 is connected to a remote host 560 through a network 115. The enhanced network disk controller 500 may be connected to a remote storage medium 565 by a SATA cable or bus 570. As known to those skilled in the art, e-SATA networks permit an external SATA connection between two elements, such as the enhanced network disk controller 500 and the remote storage medium 565. Thus, the controller 500 and medium 565 need not necessarily be co-located, although they may be.

As shown in FIG. 17 by the arrow 585, when the enhanced network disk controller 500 operates in the operating environment of FIG. 16 it performs in a manner similar to that of the improved network disk controller 210. That is, the SATA host controller module 540 is essentially ignored, as no second host (or any computing device) is connected thereto. Accordingly, packets are transmitted from the host 560, across the network 115, and received by the Ethernet controller module 505. From the Ethernet controller module 505, such packets are processed by the reception protocol handler 510, reception command handler 515, command executer 525, arbitrator 530 and SATA device controller 535 before being transmitted across the SATA bus 570 to the remote storage medium 565.

Similarly, the path 590 for packets originating at the remote storage medium 565 and transmitted to the remote host 560 is similar in the enhanced network controller 500 to the data path of the improved network controller 210. Data are passed from the remote storage medium 565 to the SATA device controller 535 and sent to the arbitrator 530. Commands are forwarded to the command executer 525, while data read from the medium 565 may be sent to the buffer 555. The transmission protocol handler 550 may combine either a command received from the transmission command handler 545 or data received from the buffer 555 (or both) with a protocol header it generates to form a packet. The packet may be passed to the Ethernet controller 505 for transmission across the network.

Figure 18:
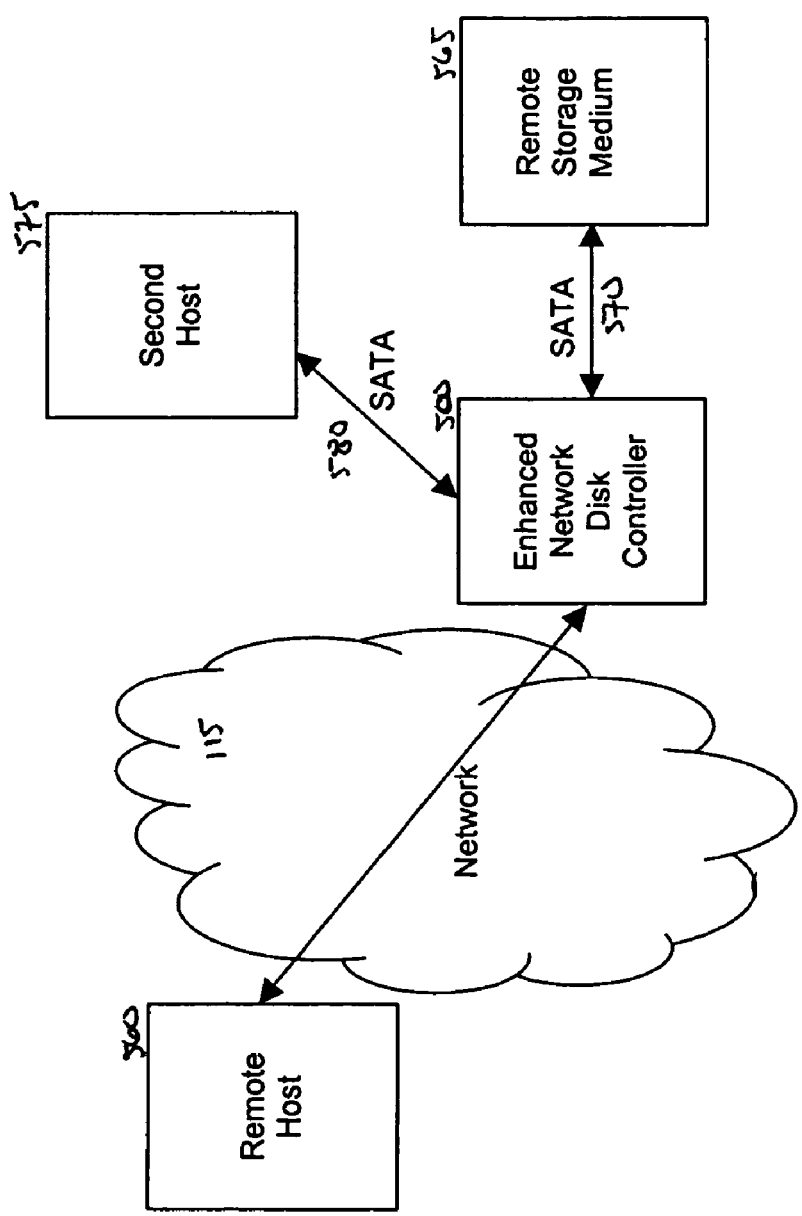
FIG. 18 depicts a second exemplary operating environment for the enhanced network disk controller of FIG. 15.

FIG. 18 depicts a second operating environment for the enhanced network disk controller 500. In this operating environment, the enhanced network disk controller 500 is connected to a remote host 560 through a network 115, a remote storage medium 565 by a first SATA connection 570, and to a second host 580 by a second SATA connection 575. The enhanced network disk controller 500 may be connected to either (or both of) the second host 575 and remote storage medium 565 by a SATA bus or SATA external cable.

In this second operating environment, the enhanced network disk controller 500 may coordinate and/or facilitate communication between the remote storage medium 565 and both the remote host 560 and second host 575.

Figure 19:
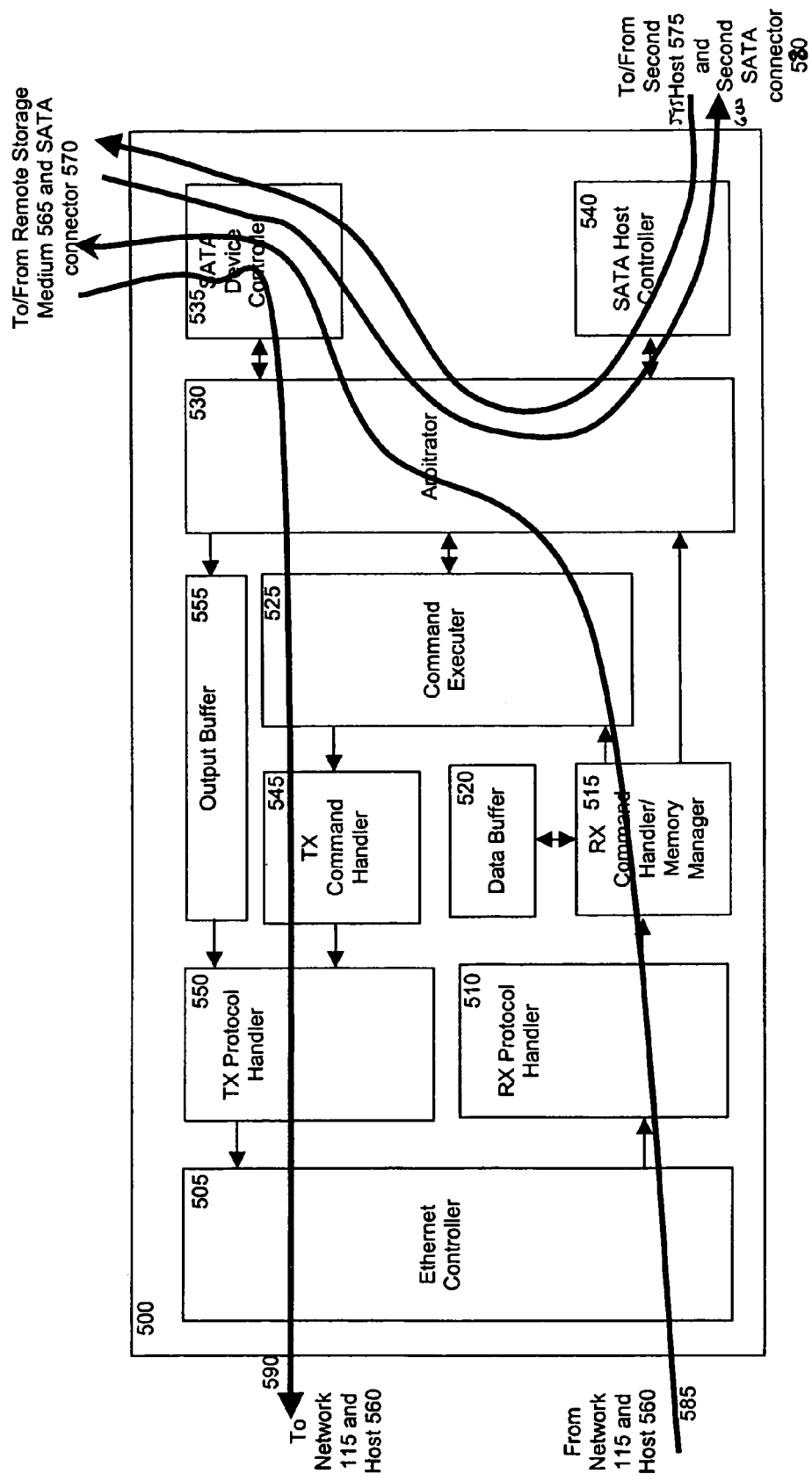

FIG. 19 depicts data paths for the enhanced network disk controller 500 when operating in the operating environment of FIG. 18. Generally, the remote host 560 may interface with the enhanced network disk controller 500 through the network 115 and the Ethernet controller module 505. Similarly, the second host 575 may interact with the enhanced network disk controller 500 through the SATA host controller 540, to which the second host is linked by a second SATA connector 580. Additionally, the remote storage medium 565 may be connected to the enhanced controller's SATA device controller 535 by a first SATA connector 570.

Accordingly, the data paths may be defined as follows. Data (or other packets) transmitted between the remote host 560 and the remote storage medium 565 generally follow the same data paths described above with respect to FIG. 17. Data and/or packets transferred between the second host and the remote storage medium follow different paths. As shown by path 595, packets transmitted from the second host to the remote storage medium are received at the SATA host controller 540, routed through the arbitrator 530 to the SATA device controller 535, and ultimately to the remote storage device. Packets sent by the remote storage device 565 to the second host 575 reverse this path.

It should be noted that packets transmitted between the second host 575 and remote storage medium 565 need not be routed through any protocol handler 510, 550, command handled 515, 545 or command executer 525. This is because the second host 575 may communicate across the SATA connectors 570, 580 with the remote storage medium 565 as if the remote storage medium were directly connected to the second host by a SATA bus. Accordingly, since the remote storage medium may be configured to recognize, issue and accept SATA commands and the second host likewise configured, no protocol layer is necessary for packets transmitted between these two devices and no particular formatting (or additional packet layers, such as network headers), are required.

However, the arbitrator module 530 nonetheless acts to control access to the remote storage medium 565 by the second host 575, as described above. In this manner, although the second host may not require any special formatting, protocols, or headers beyond those typical to the SATA bus to communicate with the remote storage medium, the enhanced network controller 500 may nonetheless maintain data integrity of the remote storage medium and coordinate multiple accesses from multiple hosts.

Figure 20:
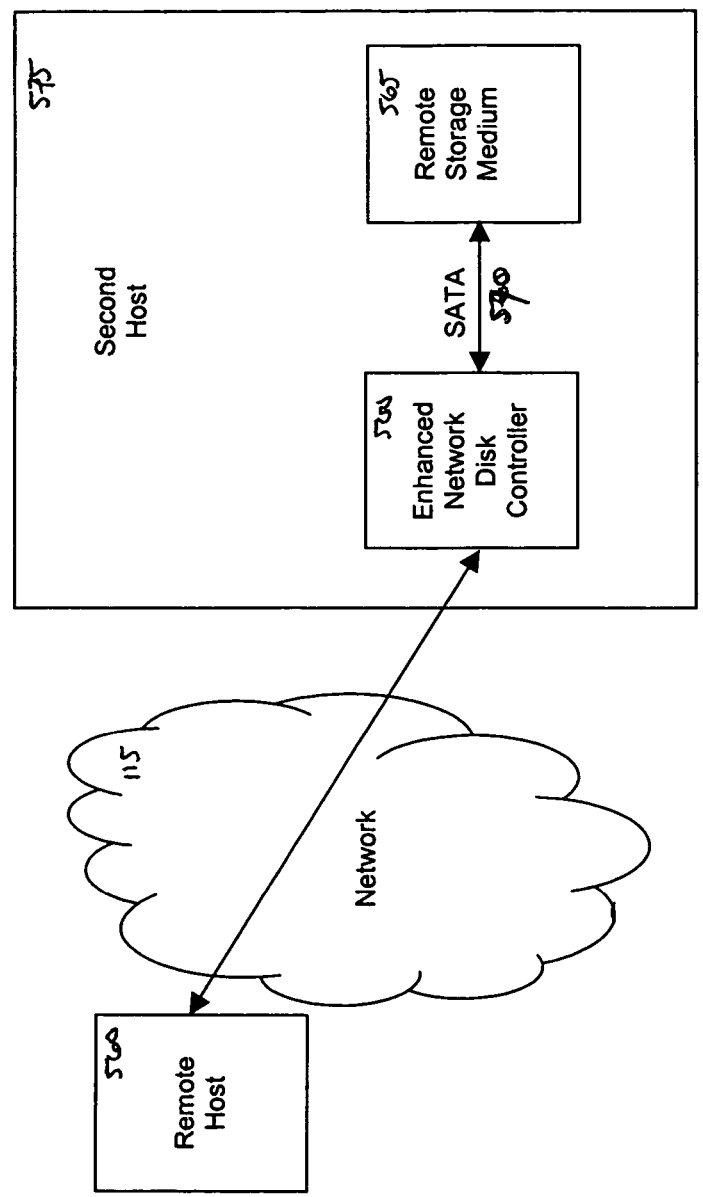
FIG. 20 depicts a third exemplary operating environment for the enhanced network disk controller of FIG. 15.

FIG. 20 depicts a third operating environment for the enhanced network disk controller 500. In this environment, the enhanced network disk controller 500 and the remote storage medium 565 are incorporated into the second host 575. The second host typically communicates with the enhanced network disk controller though an internal bus, such as a SATA bus (not shown). The second host's access to the remote storage medium 565 is managed by the enhanced network disk controller 500 as described above, even though the enhanced network disk controller and remote storage medium may be incorporated into the second host.

The remote host 560 communicates with the enhanced network disk controller 500, and through it with the remote storage medium 565, via the network 115 as described above with respect to FIGS. 16 and 18.

The data paths for each of the hosts 560, 575 to interact with the remote storage medium 565 are the same as those shown in and discussed with respect to FIG. 19.

Although FIG. 20 depicts both the enhanced network disk controller 500 and remote storage medium 565 as incorporated into the second host 575, it should be noted that only one of the two may be so incorporated. For example, the enhanced network disk controller 500 may be incorporated into the second host 575 but not the remote storage medium 565, or vice versa.

It should be noted that the general delay experienced during operation (i.e., data transmission) of the enhanced network controller 500 is comparable to, or in many cases less than, the delay experienced during operation of the improved network disk controller 210. This is so whether the enhanced network disk controller 500 interacts with the remote host 560 or the second host 575. Longer delays in transmission or receipt of data by a host 560, 575 may be experienced when the arbitrator module 530 blocks the host's access to the remote storage medium 565. Otherwise, the general operational characteristics are similar to those described above with respect to the improved network disk controller 210.

VII. CONCLUSION

The exemplary, enhanced network disk controller 500 described herein permits the access, receipt, and transmission of data across a typical network 115 (such as a home networking environment) to a remote host 560 and/or second host 575 at speeds and with delays comparable to those experienced when accessing, receiving, and/or transmitting the same data via a local disk controller locally connected to a host. Here, "locally connected" generally means connected in a non-networking environment, such as a system bus.

Although the present invention has been described with reference to particular embodiments and methods of operation, it should be understood changes or modifications to those embodiments and/or methods of operation will be apparent to those of ordinary skill in the art upon reading the present disclosure. Therefore, the proper scope of the invention is defined by the following claims.

We claim:

1. A method for accessing a storage medium across a network, the storage medium being operatively connected a network disk controller, comprising:

receiving a first packet from a first host at a first controller module of the network disk controller;

decapsulating the first packet into a header and a payload;

determining, from the header, a protocol associated with the payload;

determining whether the payload is associated with a non-network storage medium access command;

in the event the payload is associated with a non-network medium access command, executing the non-network storage medium access command;

assigning a communication link between an arbitrator and the storage medium to the first controller module;

receiving a second packet from a second host via a network at a second controller module of the network disk controller; and controlling assignment of the communication link for one of the first packet and the second packet to reach the storage medium by the arbitrator;

wherein the executing the non-network storage medium access command comprises:

reading state information indicating whether the network disk controller is to operate in a command mode or a data mode, and processing the payload based on the state information; and wherein neither the network disk controller nor the storage medium executes a network file system.

2. The method of claim 1, further comprising:

determining whether the communication link between the first controller module and the storage medium is assigned; and in the event the communication link is assigned, preventing the second packet from reaching the storage medium.

3. The method of claim 2, wherein the second packet is discarded in the event the communication link is assigned.

4. The method of claim 2, wherein: the second packet is stored in a memory in the event the communication link is assigned; and the second packet is passed to the storage medium when the communication link is no longer assigned.

5. The method of claim 1, wherein controlling assignment of the communication link comprises:

determining whether the communication link between the first controller module and the storage medium is assigned by the arbitrator; and in the event the communication link is assigned, preventing the second packet from reaching the storage medium by the arbitrator, wherein the received second packet is handled as if the storage medium is directly connected to the second host.

6. The method of claim 5, wherein the second packet is discarded in the event the communication link is assigned.

7. The method of claim 5, wherein:

the second packet is stored in a memory in the event the communication link is assigned; and the second packet is passed to the storage medium when the communication link is no longer assigned.

* * * * *